United States Patent
Yonemura et al.

(10) Patent No.: US 9,804,438 B2
(45) Date of Patent: Oct. 31, 2017

(54) LIQUID CRYSTAL DISPLAY DEVICE

(71) Applicant: Mitsubishi Electric Corporation, Tokyo (JP)

(72) Inventors: Koji Yonemura, Tokyo (JP); Manabu Iwakawa, Tokyo (JP); Akimasa Yuki, Tokyo (JP); Toshiaki Fujino, Tokyo (JP); Tetsuya Satake, Tokyo (JP); Taroh Yoshino, Tokyo (JP); Kazunori Okumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/009,857

(22) Filed: Jan. 29, 2016

(65) Prior Publication Data

US 2016/0223875 A1 Aug. 4, 2016

(30) Foreign Application Priority Data

Feb. 3, 2015 (JP) .................. 2015-019295

(51) Int. Cl.
*G02F 1/1343* (2006.01)
*G02F 1/1335* (2006.01)
*G02F 1/1337* (2006.01)

(52) U.S. Cl.
CPC ...... *G02F 1/133528* (2013.01); *G02F 1/1337* (2013.01); *G02F 1/134363* (2013.01); *G02F 2001/133749* (2013.01)

(58) Field of Classification Search
CPC ......... G02F 1/133528; G02F 1/134363; G02F 1/1337; G02F 2001/133749
See application file for complete search history.

(56) References Cited

U.S. PATENT DOCUMENTS

| | | | |
|---|---|---|---|
| 5,871,653 A * | 2/1999 | Ling ................ | B29D 11/00278 216/2 |
| 5,949,511 A * | 9/1999 | Park .................. | G02F 1/134363 349/139 |
| 6,285,430 B1 | 9/2001 | Saito | |

(Continued)

FOREIGN PATENT DOCUMENTS

| JP | 2009-276485 | 11/2009 |
|---|---|---|
| JP | 2014-115563 | 6/2014 |

OTHER PUBLICATIONS

Utsumi, et al., Improved Contrast Ratio in IPS-Pro LCD TV by Using Quantitative Analysis of Depolarized Light Leakage from Component Materials, SID 08 Digest, 2008, p. 129-132.

*Primary Examiner* — Donald Raleigh

(74) *Attorney, Agent, or Firm* — Studebaker & Brackett PC

(57) ABSTRACT

Liquid crystal molecules have a pretilt angle to the left-and-right direction in a plane perpendicular to the up-and-down direction, so that an end part of a first side as one side of a left side and a right side of the liquid crystal molecules is set closer to a backlight than an end part of a second side as the other side. Second edge parts of a black matrix adjacent to an upper side and a lower side of an opening have a straight line shape extending by inclination to mutually the same side in the left-and-right direction, so that an end part of the same side as a first side as one side of the left side and the right side of the second edge parts is positioned above the end part of the same side as the second side as the other side.

9 Claims, 27 Drawing Sheets

(56) References Cited

U.S. PATENT DOCUMENTS

| | | | |
|---|---|---|---|
| 8,094,283 B2 | 1/2012 | Ogura et al. | |
| 2006/0050218 A1* | 3/2006 | Baek | G02F 1/133555<br>349/141 |
| 2010/0066949 A1* | 3/2010 | Utsumi | G02F 1/133528<br>349/99 |
| 2012/0008058 A1* | 1/2012 | Kim | G02F 1/133371<br>349/41 |
| 2013/0286329 A1* | 10/2013 | Goto | G02B 5/3083<br>349/96 |
| 2014/0152934 A1* | 6/2014 | Huh | G02F 1/133707<br>349/43 |
| 2014/0160401 A1 | 6/2014 | Yonemura et al. | |
| 2014/0293176 A1* | 10/2014 | Tamaki | G02F 1/134363<br>349/33 |
| 2015/0131037 A1* | 5/2015 | Kim | G02F 1/133528<br>349/96 |

* cited by examiner

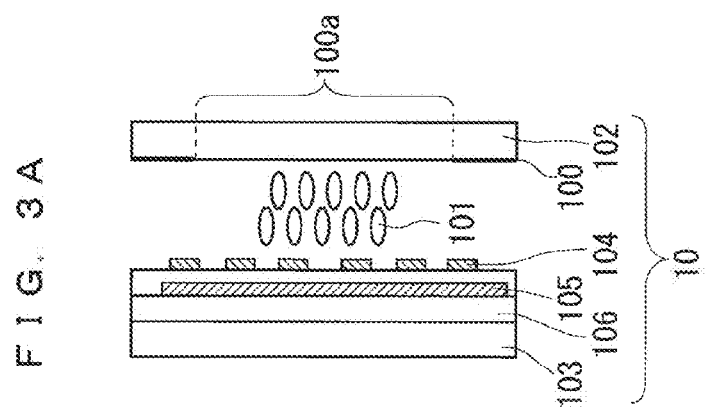
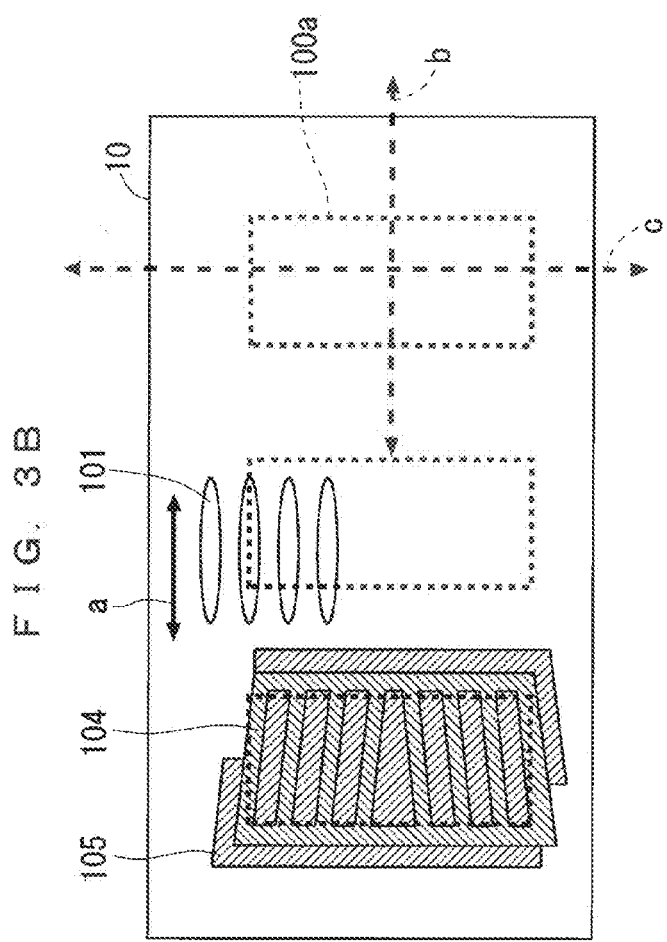
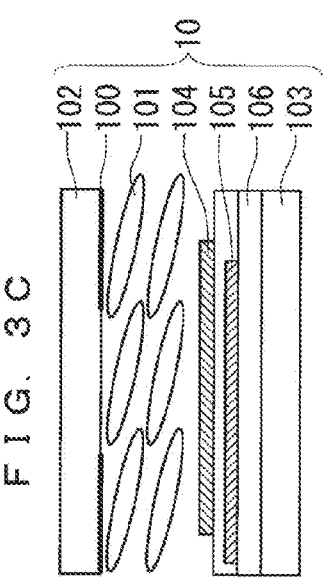

F I G . 4
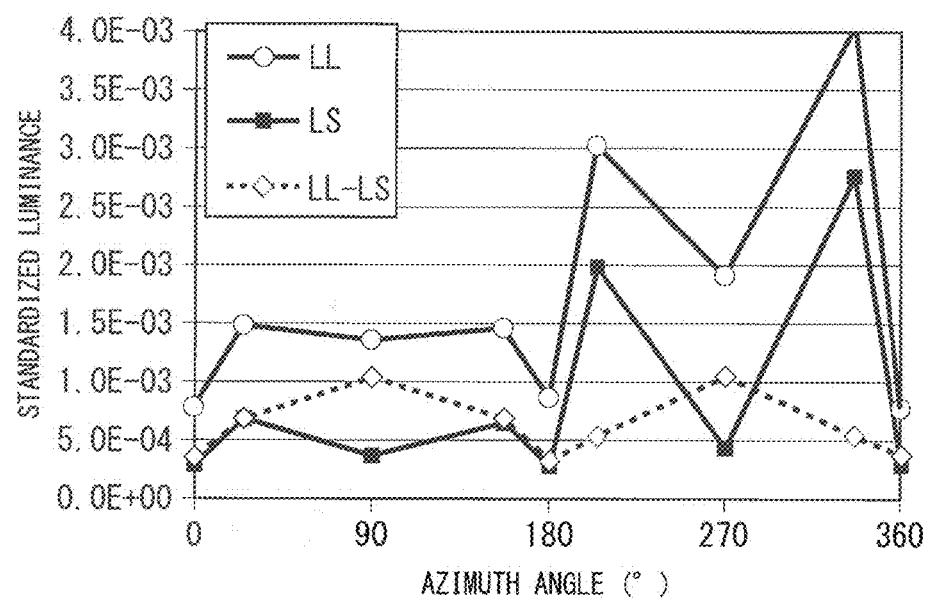

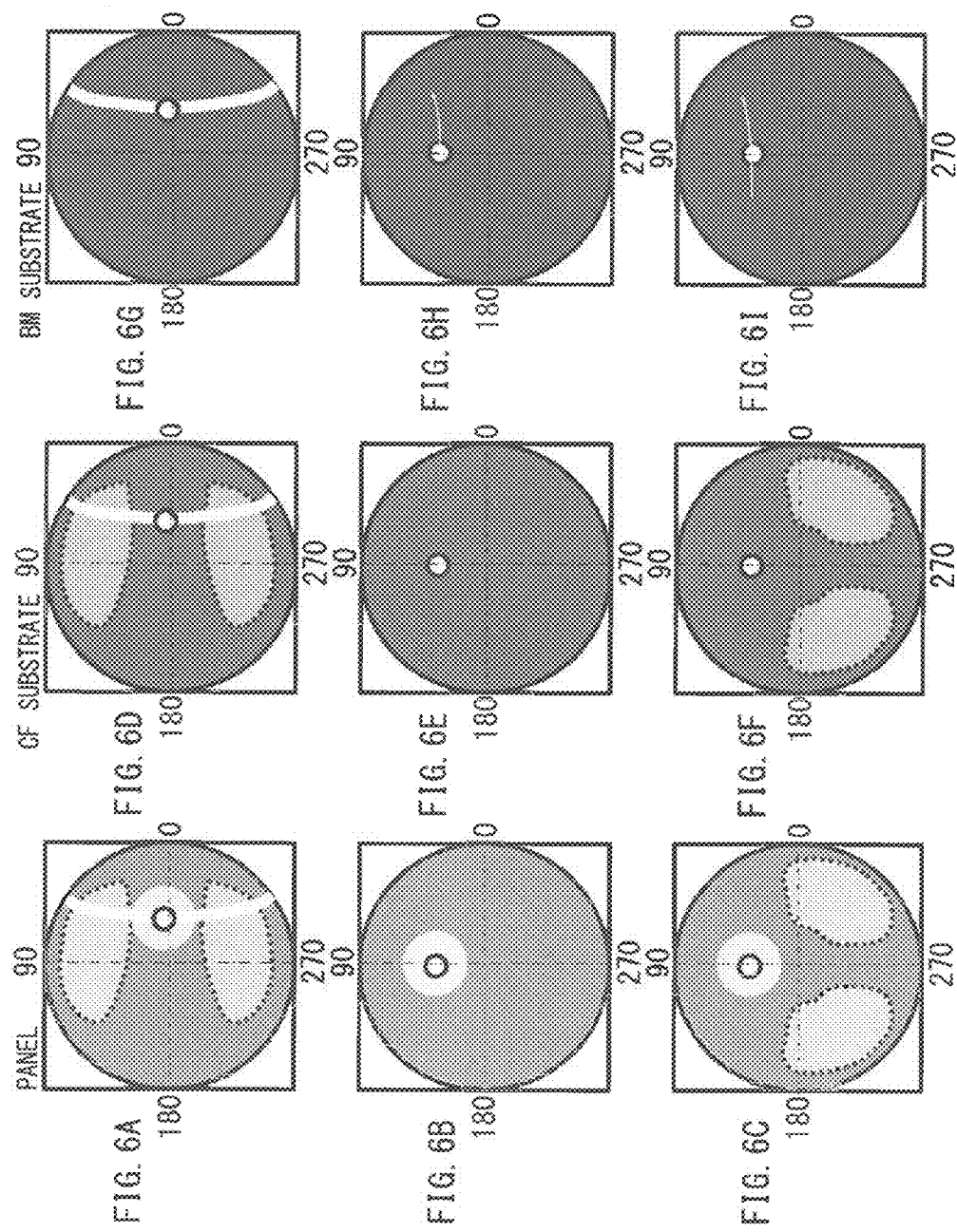

F I G. 7

| NAME | GENERATION SOURCE | LUMINOUS INTENSITY DISTRIBUTION | LIGHT SOURCE INCIDENT DIRECTION DEPENDENCY OF LUMINOUS INTENSITY |
|---|---|---|---|
| DIFFRACTION SCATTERING LEAKAGE LIGHT | BM OPENING DIFFRACTED LIGHT | CLEAR STRIPE SHAPE AND CRESCENT SHAPE | STRONGLY DEPENDENT ON INCIDENT DIRECTION AND POLARIZATION DIRECTION, AND IS GENERATED WHEN INCIDENT POLARIZATION IS P WAVE AND IS NOT GENERATED WHEN INCIDENT POLARIZATION IS S WAVE |
| | ARRAY DIFFRACTION | CLEAR STRIPE SHAPE AND CRESCENT SHAPE | STRONGLY DEPENDENT ON INCIDENT DIRECTION AND POLARIZATION DIRECTION, AND IS GENERATED WHEN INCIDENT POLARIZATION IS P WAVE AND IS NOT GENERATED WHEN INCIDENT POLARIZATION IS S WAVE |
| CF COLOR-MATERIAL SCATTERING LEAKAGE LIGHT | COLOR MATERIAL SCATTERING | MILD DISTRIBUTION | |
| | MULTIPLEX SCATTERING? | UNIFORM IN ALL AZIMUTHS | IS GENERATED REGARDLESS OF POLARIZATION PLATE AXIS |
| LIQUID CRYSTAL LAYER SCATTERING LEAKAGE LIGHT | LIQUID CRYSTAL LAYER | CONCENTRIC CIRCULAR SHAPE CENTERED AROUND LIGHT RAY INCIDENT DIRECTION | IS GENERATED REGARDLESS OF INCIDENT DIRECTION AND POLARIZATION DIRECTION |

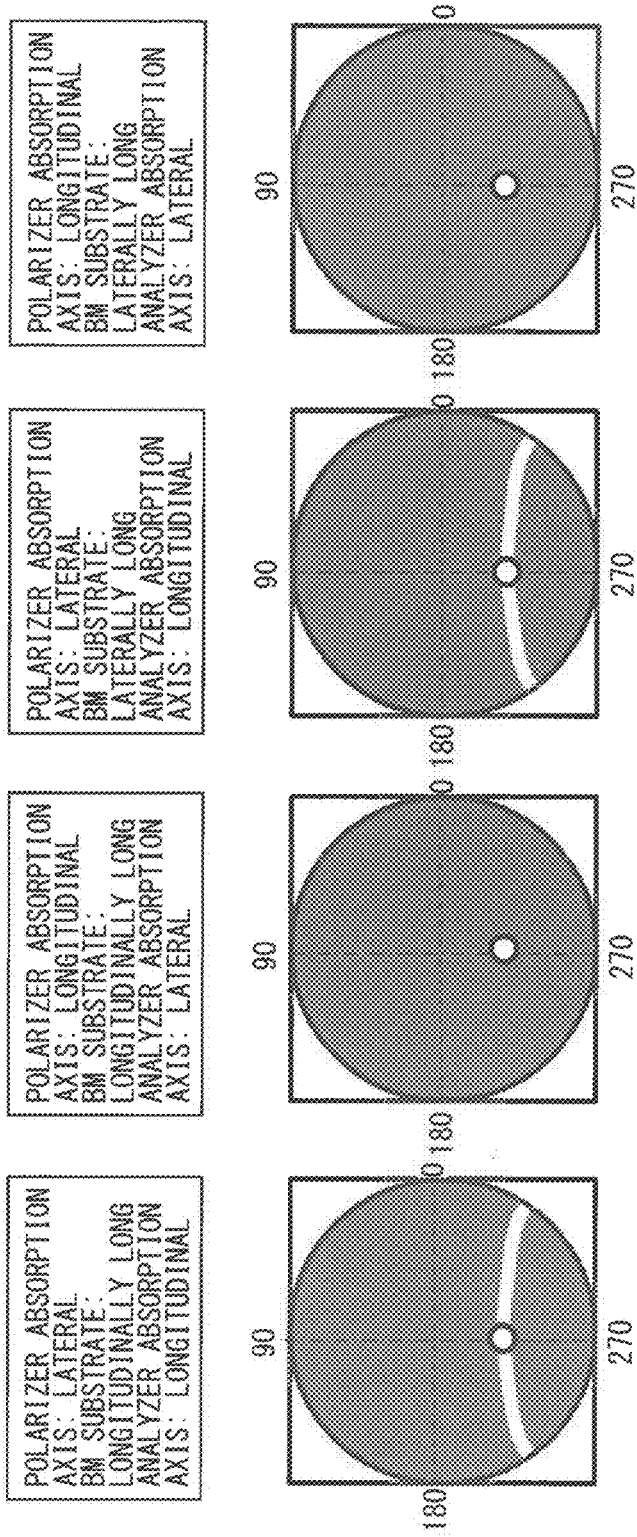

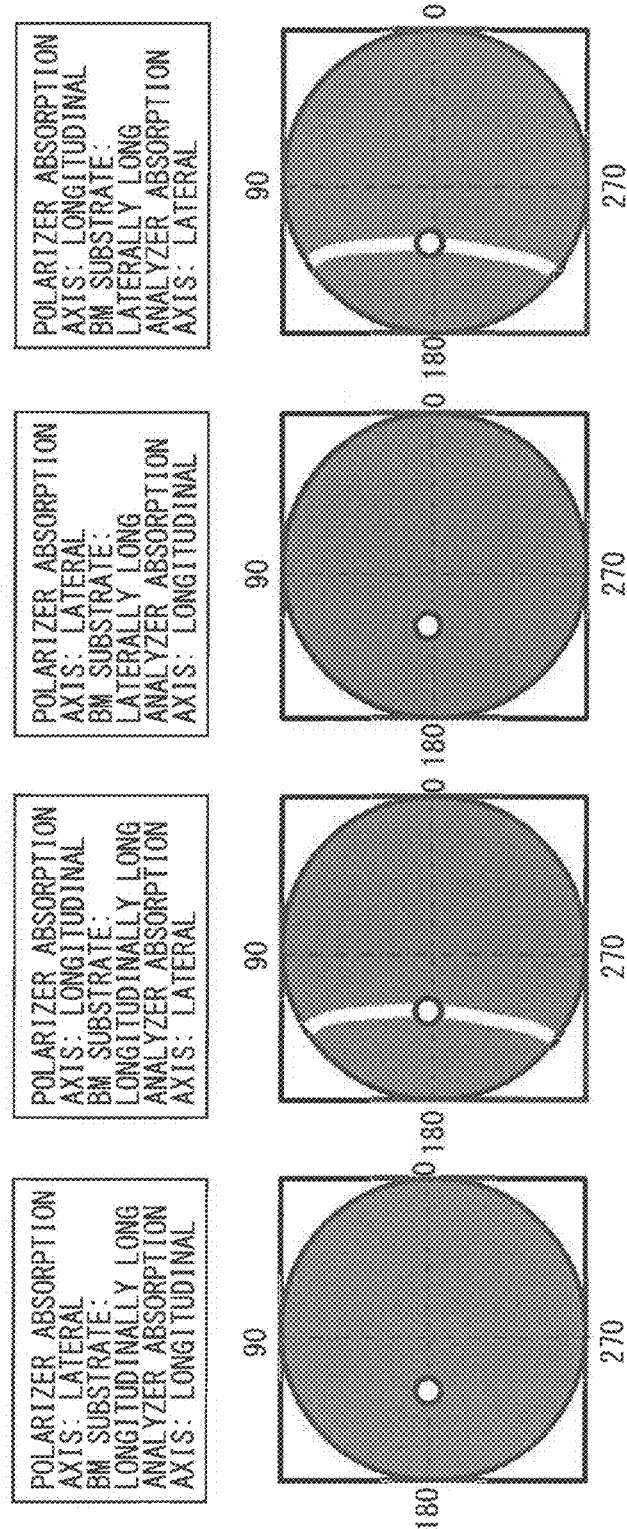

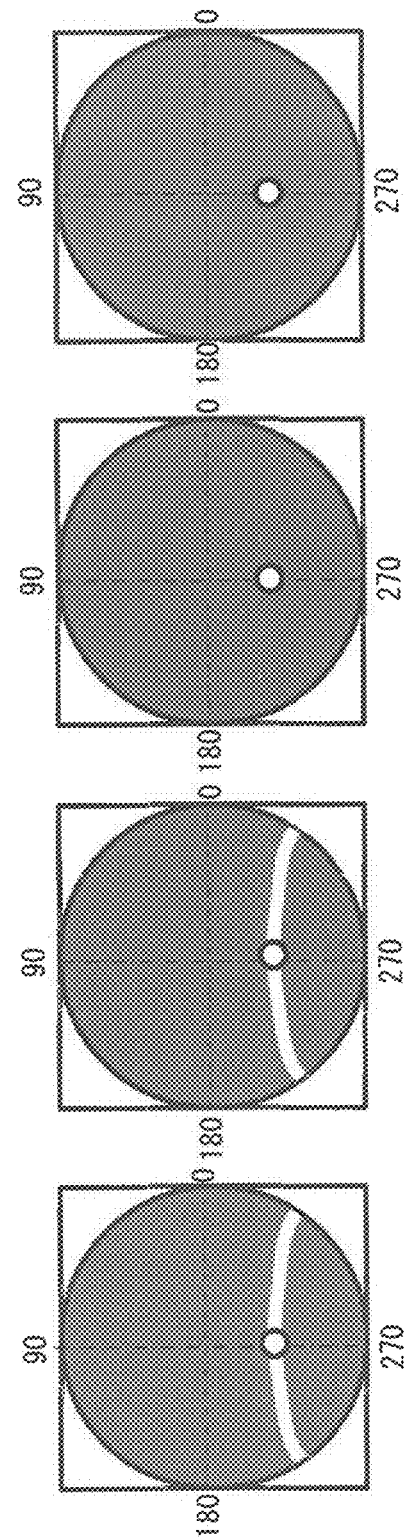

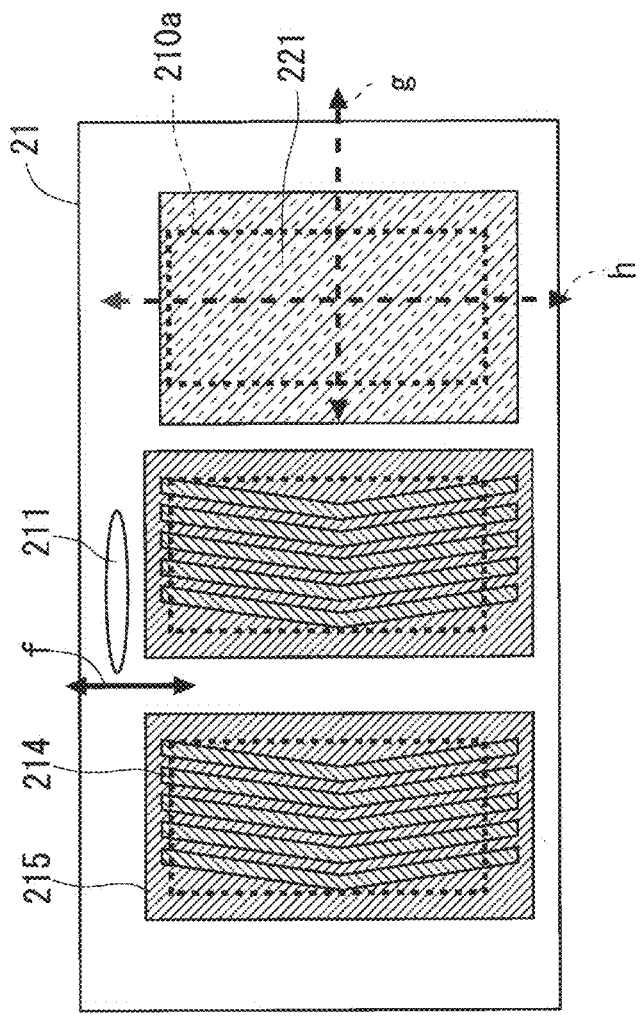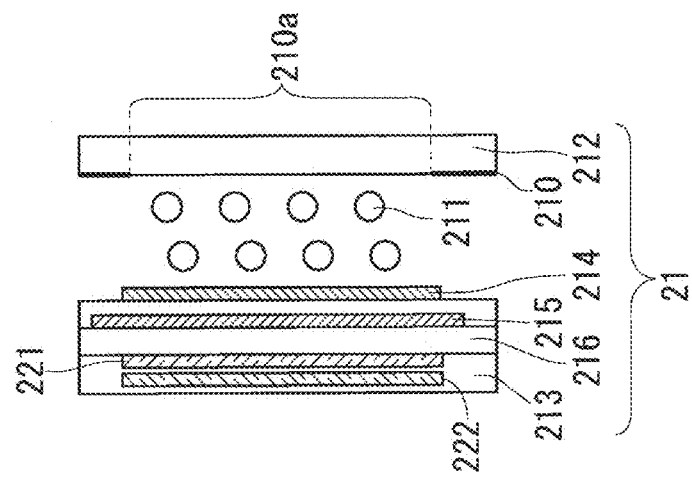
FIG. 24A
FIG. 24B

LIQUID CRYSTAL DISPLAY DEVICE

BACKGROUND OF THE INVENTION

Field of the Invention

The present invention relates to a liquid crystal display device in an IPS (In-Plane Switching) mode or an FFS (Fringe Field Switching) mode.

Description of the Background Art

Electrodes of a liquid crystal display device in the IPS mode are arranged such that an electric field is applied in parallel to the liquid crystal surface. The IPS panel has an active matrix driving electrode including a pair of electrodes that are arranged in the same plane. The IPS panel can rotate a direction of liquid crystal molecules in the panel surface. Therefore, the IPS panel has an excellent view angle characteristic.

The liquid crystal display device in the FFS mode is a display system that performs display by adding a fringe electric field to the liquid crystal which is sandwiched between counter substrates. According to the liquid crystal display device in the FFS mode, the pixel electrode and the counter electrodes are formed of transparent conductive films, so that an opening ratio and transmittance that are higher than those in the IPS mode can be obtained.

It is general that an orientation film is formed on top surfaces of two substrates on the liquid crystal layer side and orientation of liquid crystals is controlled by a rubbing process of the orientation film. The orientation film has a pretilt angle in the range between 0 degrees or above and 5 degrees or below. Due to the pretilt angle, a distortion occurs in the view angle characteristic.

In U.S. Pat. No. 6,285,430, for example, there is disclosed a liquid crystal display device in the IPS mode which uses a positive biaxial retardation film (also referred to as a biaxial retardation film). By using the positive biaxial retardation film, black level luminance of the liquid crystal display device in the IPS mode can be reduced in the azimuth angle direction (an oblique direction) of particularly 45 degrees, 135 degrees, 225 degrees, and 315 degrees.

Further, in Japanese Patent Application Laid-Open No. 2014-115563, for example, there is disclosed in detail a configuration of a liquid crystal display device in the IPS mode which uses a positive biaxial retardation film. That is, the liquid crystal display device includes a liquid crystal layer sandwiched between a first substrate and a second substrate, a biaxial retardation film arranged on the side where light enters the liquid crystal layer, a first polarization plate arranged on the outer side of the biaxial retardation film, and a second polarization plate provided on the opposite side of the first polarization plate by sandwiching the liquid crystal layer. An orientation direction of the liquid crystal layer is set in a direction parallel to the extending direction of a common wire. A slow axis of the biaxial retardation film is set in a direction parallel to or orthogonal to the orientation direction of the liquid crystal layer. One of absorption axes of the first and second polarization plates is set in a direction parallel to the orientation direction of the liquid crystal layer, and the other is set in a direction orthogonal to the orientation direction. As described above, according to a configuration in which a biaxial retardation film is arranged on the light incident side below the liquid crystal layer, it is possible to obtain a desired optical compensation effect without receiving the influence of a disordered state of the liquid crystal layer.

Further, in Japanese Patent Application Laid-Open No.2009-276485, for example, there is disclosed a structure in which in order to suppress the increase in black level luminance due to polarization cancellation of reflected light on the side surface of a metal wire, a direction of the side of the metal wire is set orthogonal to or parallel to a direction of the polarization.

Further, in Yuka Utsumi, Shintaro Takeda, Hiroyuki Kagawa, Daisuke Kajita, Bum Hiyama, and Yasushi Tomioka, " Improved Contrast Ratio in IPS-Pro LCD TV by Using Quantitative Analysis of Depolarized Light Leakage from Component Materials", SID 08 DIGEST, 2008, p.129, for example, it is described that existence of scattering leakage light due to a color filter (CF) and a liquid crystal molecules gives an non-negligible influence to the front contrast ratio (front CR).

In a liquid crystal display for an on-vehicle center console, it is desirable to realize high contrast in an angle area in the front direction surrounded by an upper left oblique direction and an upper right oblique direction (polar angle 42 degrees and azimuth angle 24 degrees, and polar angle 42 degrees and azimuth angle 156 degrees) and a lower left oblique direction and a lower right oblique direction (polar angle 42 degrees and azimuth angle 12 degrees, and polar angle 42 degrees and azimuth angle 178 degrees). However, the liquid crystal display has a view angle characteristic that contrast is unbalanced in a specific direction, such as the contrast in the upper right oblique direction (polar angle 42 degrees and azimuth angle 24 degrees) is high but the contrast in the left direction (polar angle 42 degrees and azimuth angle 156 degrees) is low.

To cope with such a problem, in the liquid crystal display device in the IPS and FFS modes, by using the biaxial retardation film, black level luminance not only in the front direction and left and right directions but also oblique direction has been reduced to some extent.

In a conventional liquid crystal display device, a proper view angle characteristic is designed, by performing a calculation considering the incident angle (polar angle and azimuth angle) of coherent parallel light, axis angle of the polarization plate, birefringence and orientation state of liquid crystal molecules, axis angle and birefringence index of the phase difference plate, by using a general-purpose simulator (an LCD master, for example) that performs a polarization calculation using a Jones matrix.

However, in the liquid crystal display device in the FFS mode that uses the biaxial retardation film disclosed in Japanese Patent Application Laid-Open No. 2014-115563, divergence between the calculation value and the measurement value tends to become large. Further, there is still a problem in that black level luminance in a specific direction is high and the view angle characteristic has a distorted distribution.

In the light of the content of Japanese Patent Application Laid-Open No.2009-276485, this problem is considered because the influence of scattering light that is not considered in the polarization calculation using the Jones matrix relatively increases. Because scattering leakage light is radiated to a direction different from a direction of an incident light ray, the inventor has considered that the oblique light of the backlight (BL) also has the influence to the front CR. That is, the inventor has considered that the existence of scattering leakage light in a specific view angle direction gives a non-negligible influence to black level luminance A prior-art literature concerning a quantitative influence of scattering leakage light to black level luminance and a change thereof due to the configuration of a liquid crystal display device has not been disclosed so far as the inventor knows.

SUMMARY OF THE INVENTION

The present invention has been made in the light of the above problem. An object of the present invention is to provide a technique capable of suppressing black level luminance in the upper left direction and the upper right direction in the liquid crystal display device in the IPS or FFS mode.

A liquid crystal display device according to a first aspect of the present invention includes a light source in which a light distribution characteristic in a left-and-right direction is wider than a light distribution characteristic in an up-and-down direction, and a liquid crystal panel in an IPS (In-Plane Switching) mode or an FFS (Fringe Field Switching) mode in which light from the light source is capable of passing. The liquid crystal panel includes: a liquid crystal cell which includes a first transparent substrate, a second transparent substrate arranged between the first transparent substrate and the light source, liquid crystal molecules sandwiched between the substrates, and a black matrix having an opening through which light from the light source is capable of passing; a polarizer which is arranged on the light source side with respect to the liquid crystal cell and in which an absorption axis is aligned in the up-and-down direction; an analyzer which is arranged on a side opposite to the light source side with respect to the liquid crystal cell and in which an absorption axis is aligned in the left-and-right direction; and a biaxial retardation film which is arranged between the polarizer and the liquid crystal cell. The liquid crystal molecules have a pretilt angle to the left-and-right direction in a plane perpendicular to the up-and-down direction, so that an end part of a first side as one side of a left side and a right side of the liquid crystal molecules viewed from the analyzer is set closer to a backlight than an end part of a second side as the other side. First edge parts of the black matrix adjacent to a left side and a right side of the opening have a straight line shape extending in the up-and-down direction. Second edge parts of the black matrix adjacent to the upper side and the lower side of the opening have a straight line shape extending by inclination to mutually the same side with respect to the left-and-right direction, so that an end part of the same side as a first side as one side of the left side and the right side of the second edge parts viewed from the analyzer is positioned above an end part of the same side as the second side as the other side.

A liquid crystal display device according to a second aspect of the present invention includes a light source and a liquid crystal panel in an IPS (In-Plane Switching) mode or an FFS (Fringe Field Switching) mode in which light from the light source is capable of passing. The liquid crystal panel includes: a liquid crystal cell which includes a first transparent substrate, a second transparent substrate arranged between the first transparent substrate and the light source, liquid crystal molecules sandwiched between the substrates; a polarizer which is arranged on the light source side with respect to the liquid crystal cell and in which an absorption axis is aligned in the up-and-down direction; an analyzer which is arranged on a side opposite to the light source side with respect to the liquid crystal cell and in which an absorption axis is aligned in the left-and-right direction; and a biaxial retardation film which is arranged between the polarizer and the liquid crystal cell. The liquid crystal cell includes at least one of a pixel electrode and a common electrode each having a plurality of belt-shaped portions extending to the up-and-down direction by inclination at an angle of 5 degrees or above and 10 degrees or below, and the liquid crystal molecules are negative liquid crystals.

A liquid crystal display device according to a third aspect of the present invention includes a light source and a liquid crystal panel in an IPS (In-Plane Switching) mode or an FFS (Fringe Field Switching) mode in which light from the light source is capable of passing. The liquid crystal panel includes: a liquid crystal cell which includes a first transparent substrate, a second transparent substrate arranged between the first transparent substrate and the light source, liquid crystal molecules sandwiched between the substrates; a polarizer which is arranged on the light source side with respect to the liquid crystal cell and in which an absorption axis is aligned in the up-and-down direction; an analyzer which is arranged on a side opposite to the light source side with respect to the liquid crystal cell and in which an absorption axis is aligned in the left-and-right direction; and a biaxial retardation film which is arranged between the analyzer and the liquid crystal cell. The liquid crystal cell includes at least one of a pixel electrode and a common electrode each having a plurality of belt-shaped portions extending to the left-and-right direction by inclination at an angle of 5 degrees or above and 10 degrees or below, and the liquid crystal molecules are negative liquid crystals.

In the liquid crystal display device in the IPS or FFS mode, black level luminance in the upper left direction and the upper right direction can be suppressed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A, 3B, and 3C are views illustrating a configuration of a liquid crystal cell according to the relevant device;

FIG. 4 is a diagram illustrating azimuth angle dependency of black level luminance of the relevant device;

FIGS. 6A to 6I are contour views illustrating results of a light distribution characteristic of scattering leakage luminance by beam incident light in the relevant device;

FIG. 7 is a table illustrating features of various kinds of scattering leakage light;

FIGS. 8A to 8D are contour views illustrating luminance distributions of diffraction leakage light in the case where beam incident light (polar angle 30 degrees and azimuth angle 270 degrees) enters a BM substrate sample;

FIGS. 9A to 9D are contour views illustrating luminance distributions of diffraction leakage light in the case where beam incident light (polar angle 30 degrees and azimuth angle 180 degrees) enters a BM substrate sample;

FIGS. 10A to 10D are contour views illustrating luminance distributions of diffraction leakage light in the case where beam incident light (polar angle 30 degrees and azimuth angle 270 degrees) enters a BM substrate sample;

FIGS. 24A and 24B are views illustrating a configuration of a liquid crystal cell according to a second preferred embodiment;

DESCRIPTION OF THE PREFERRED EMBODIMENTS

<Relevant Device>

First, before describing liquid crystal display devices according to preferred embodiments of the present invention, in a liquid crystal display device in the FFS mode relevant to the liquid crystal display device (hereinafter, "relevant device"), there will be described a light distribution characteristic of black level luminance for determining contrast in an oblique direction and an analysis result of the determination. The following analysis result has been obtained by the inventor, and concerning the following investigation result, nothing has been disclosed in the prior art literatures so far as the inventor knows.

Figure 1:
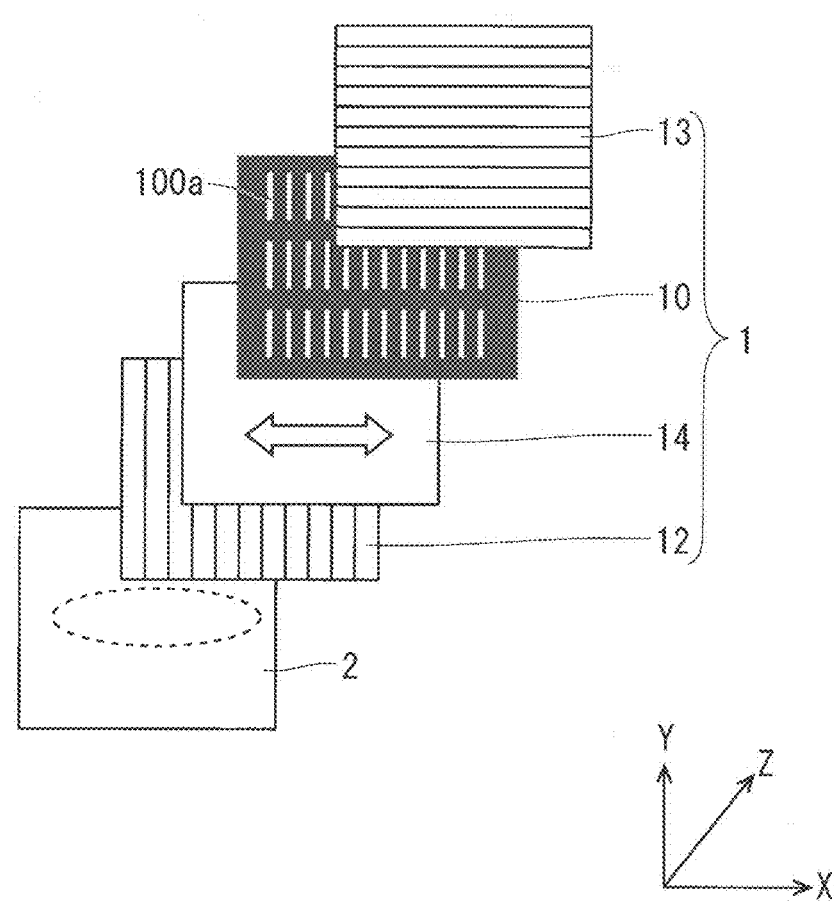
FIG. 1 is an exploded view illustrating a configuration of a relevant device.

FIG. 1 is an exploded view illustrating a configuration of the relevant device. The relevant device includes a liquid crystal panel 1 and a backlight 2. The liquid crystal panel 1 includes a liquid crystal cell 10 in the FFS mode, a polarizer 12, an analyzer 13, and a biaxial retardation film 14. The backlight 2 has a light distribution characteristic that light distribution is wide in the left-and-right direction and narrow in the up-and-down direction, by generally using a laterally long lens-sheet and a diffusion sheet that are not illustrated. That is, the light distribution characteristic of a light source (the backlight 2, the lens sheet, and the diffusion sheet) is that the light distribution to the left-and-right direction is wider than that in the up-and-down direction. Hereinafter, the light source and the backlight 2 will be described without distinction.

Figure 2:
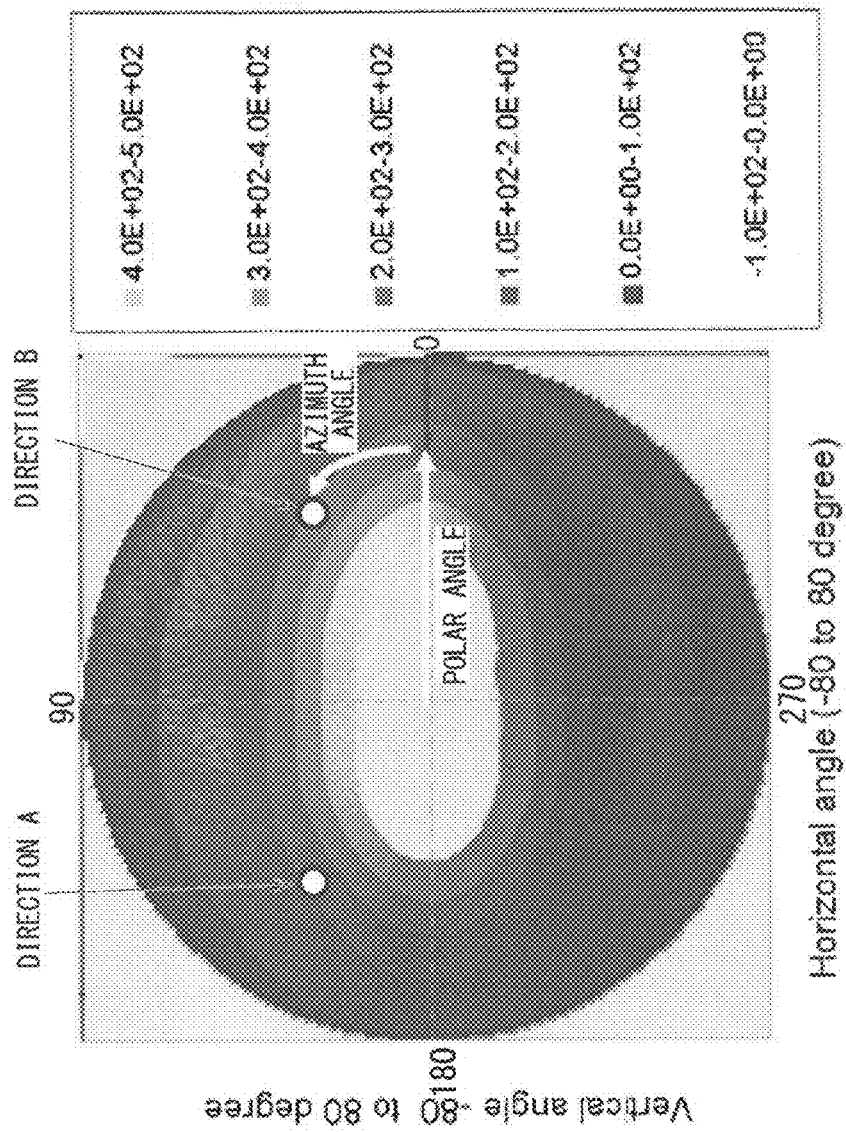
FIG. 2 is a contour view illustrating a light distribution characteristic of backlight according to the relevant device.

FIG. 2 is a contour view illustrating a light distribution characteristic of linear polarization that has passed from the backlight 2 through a polarization plate (polarizer 12) of the liquid crystal panel 1 on the backlight 2 side. There is a case where polarization is radiated due to the installation of a polarization reflection plate (not illustrated) on the top surface of the backlight 2. Therefore, the light distribution characteristic of the linear polarization that passes through the polarization plate 12 of the liquid crystal panel 1 on the backlight 2 side is important. The light distribution characteristic illustrated in FIG. 2 can be measured by measuring luminance by placing a glass substrate with the polarizer 12 on the backlight 2. In FIG. 2, polar angle 0° is a front direction and corresponds to a coordinate origin of the center of a circle, and polar angle increases corresponding to the increase in the distance from the center. The azimuth angle 0° corresponds to the right direction from the center of the circle, and the azimuth angle increases corresponding to the increase in the counterclockwise direction from 0°. Then, where luminance is higher, the luminance is illustrated whiter. This is also applied in other similar contour views as well as in FIG. 2.

The liquid crystal cell 10 includes a black matrix having an opening 100a through which light from the backlight 2 can pass. The opening 100a has a longitudinal rectangular shape which is long in the up-and-down direction, and a plurality of the openings 100a are laid out in the up-and-down and left-and-right directions as sub-pixels. Further, color filters in a blue color, a red color, and a green color not illustrated are provided in these openings 100a.

The polarizer 12 as a polarization plate is arranged on the light source side with respect to the liquid crystal cell 10. The absorption axis of the polarizer 12 is aligned to the up-and-down direction.

The analyzer 13 as a polarization plate is arranged on an observer side of the liquid crystal cell 10 (a side opposite to the light source). The absorption axis of the analyzer 13 is aligned to the left-and-right direction orthogonal to the absorption axis of the polarizer 12. That is, the polarizer 12 and the analyzer 13 form crossed nicols.

The biaxial retardation film 14 is arranged between the polarizer 12 and the liquid crystal cell 10. The biaxial retardation film 14 is the biaxial retardation film that can adjust the optical axis direction and the phase difference value. In the case where the left-and-right direction of the liquid crystal cell 10 is X, the up-and-down direction is Y, and the front-and-back direction as a direction from the observer is Z, then refractive indexes nx, ny, and, nz in the X, Y, and Z directions have a relation of nx>ny, nz, and ny≠nz. More specifically, in the case where (nx−nz)/(nx−ny)=1/2 and the thickness of the biaxial retardation film 14 is d, a relationship of (nx−ny)×d=275 nm is established. A feature of such a biaxial retardation film is that the film works as about a λ/2 plate regardless of the angle observed in the wavelength light of 550 nm in which visibility is high. As such a biaxial retardation film, there is an NAZ film manufactured by Nitto Denko Corporation, for example. A white arrow in FIG. 1 illustrates a direction of a slow axis in the cross section of a refractive index ellipsoid that works in the light proceeding in the front direction of the biaxial retardation film 14.

FIGS. 3A, 3B, and 3C are views schematically illustrating a configuration of the liquid crystal cell 10 in the FFS mode of the relevant device. FIG. 3A is a sectional view of the liquid crystal cell 10 viewed from a side surface, FIG. 3B is a front view of the liquid crystal cell 10 viewed from a side of an observer, and FIG. 3C is a sectional view of the liquid crystal cell 10 viewed from a lower surface.

The liquid crystal cell 10 includes a black matrix 100, a liquid crystal layer in which liquid crystal molecules 101 are orientated, a first glass substrate 102, a second glass substrate 103, a pixel electrode 104, a common electrode 105, and an insulation film 106. The first glass substrate 102 is arranged on the observer side, the second glass substrate 103 is arranged between the first glass substrate 102 and the backlight 2, so that the second glass substrate 103 is arranged nearer the backlight 2 than the first glass substrate 102.

On the first glass substrate 102 on the observer side, the black matrix 100 is selectively formed by depositing a thin film that absorbs light. The black matrix 100 is patterned, and the openings 100a through which the light from the backlight 2 can pass are provided. Each opening 100a of the black matrix 100 (hereinafter, also referred to as a "BM opening 100a") has a longitudinal quadrangular shape of which the left and right sides are extended to the up-and-down direction, and the upper and lower sides are extended to the left-and-right direction. The light from the backlight 2 is diffracted after passing through the BM opening 100a, and diffracted light b and c are generated.

On the second glass substrate 103 on the backlight 2 side, the pixel electrode 104 and the common electrode 105 are formed via the insulation film 106, and the pixel electrode 104 and the common electrode 105 are insulated by the insulation film 106. In this case, the pixel electrode 104 is formed by patterning transparent conductive films made of ITO (Indium Tin Oxide) or the like of a belt shape as illustrate in FIG. 3B. The common electrode 105 is a transparent conductive film made of ITO or the like patterned in a rectangular shape to cover the BM opening.

As a laminated film of the first glass substrate 102 on the side nearest to the second glass substrate 103 and as a laminated film of the second glass substrate 103 on the side nearest to the first glass substrate 102, there are formed orientation films (not illustrated) that are rubbed to the left-and-right direction indicated by an arrow a. It is general that the liquid crystal molecules 101 are positive liquid crystals having positive dielectric anisotropy. By the orientation films, the liquid crystal molecules 101 sandwiched between the first and second glass substrates 102 and 103 are orientated in the state of having a pretilt angle which is inclined to the front-and-back direction by about 1 degree to 5 degrees to the left-and-right direction.

Figure 5:
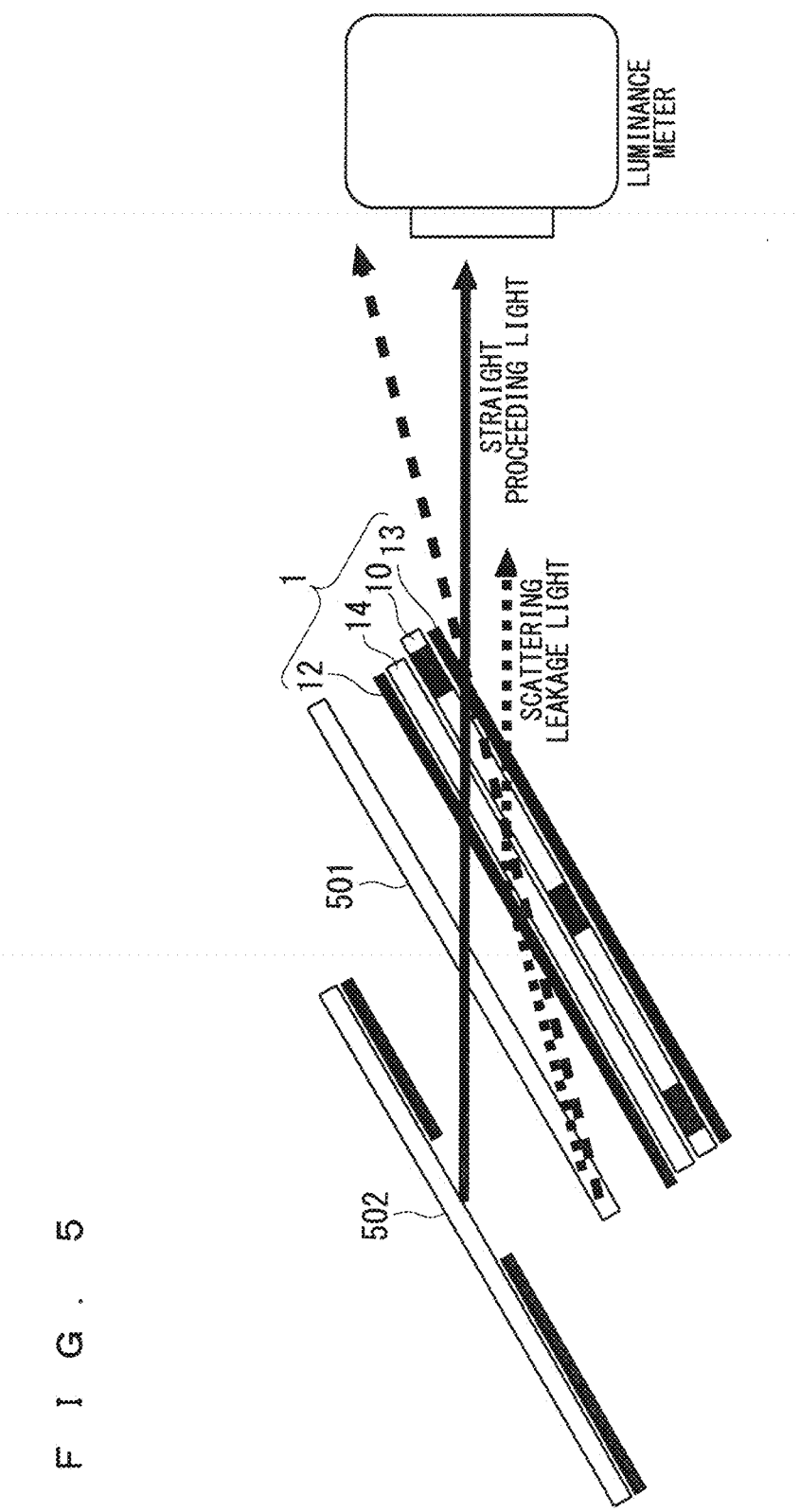
FIG. 5 is a view illustrating a measuring system of black level luminance.

FIG. 4 illustrates azimuth angle dependency of black level luminance in an oblique direction in the relevant device, and FIG. 5 is a view illustrating a measuring system of black level luminance. A detail of the measuring system in FIG. 5 will be described later.

FIG. 4 illustrates a change of black level luminance due to the azimuth angle, assuming polar angle as common in 45 degrees. The longitudinal axis expresses a standardized luminance value having luminance standardized as one in the case where the analyzer 13 is not provided.

In the measuring system in FIG. 5, the liquid crystal panel 1 is installed with inclination to a luminance meter (this inclination corresponds to polar angle). Further, a backlight 501 is arranged at a position of 20 mm behind the liquid crystal panel 1. In this state, luminance in the center is measured by rotating the liquid crystal panel 1 (this rotation angle is the azimuth angle).

In FIG. 4, LL indicates azimuth angle dependency of black level luminance in the oblique direction in the relevant device in the case where the backlight of the light distribution characteristic illustrated in FIG. 2 is used for the backlight 501 in FIG. 5. In FIG. 4, LS indicates azimuth angle dependency of black level luminance in the oblique direction in the relevant device in the case where a backlight 502 in FIG. 5 is used which is the backlight of a light distribution characteristic illustrated in FIG. 2 covered with a light shielding plate having an opening of a square shape of 10 mm×10 mm on the surface of the backlight. The backlight 502 is moved to the up-and-down and left-and-right directions at a position of 20 mm behind the liquid crystal panel 1, and is arranged such that the light source exists at only the position behind the measuring direction (the backlight of narrow light distribution characteristic). Then, luminance is measured.

In FIG. 4, as compared with the standardized luminance (LL) of the backlight 501 having no light shielding plate, the standardized luminance (LS) of the backlight 502 covered with the light shielding plate reduces the leakage luminance in all azimuth angles. LL-LS indicated by a broken line in FIG. 4 expresses a luminance difference between LL and LS. This difference LL-LS is black level luminance attributable to the light from a portion which is covered with the light shielding plate out of the backlight 502, that is, scattering leakage-light luminance. From the result of FIG. 4, it can be understood that in the relevant device, scattering leakage light becomes a factor that increases black level luminance, and scattering leakage light gives a non-negligible influence to black level luminance As configuration elements that incur such scattering, there are considered a liquid crystal layer, a color filter, and a BM opening and an electrode pattern in the BM opening. The present inventor has studied characteristics of scattering leakage light due to the scattering elements.

For performing measurement, the measuring system illustrated in FIG. 5 has been used. In this measurement, a white LED of a point light source has been installed at a position of an opening part of the light shielding plate covered with the backlight 502 in FIG. 5. As the luminance meter, a view angle measuring device capable of performing measurement of the spectral luminance distribution (EZ contrast, for example) has been used. Then, a luminance light-distribution characteristic of scattering leakage light generated by the beam ray running between a measuring region and a point light source has been measured. As samples to be measured, the liquid crystal cell 10 (a panel sample) of the relevant device, a color filter substrate (a CF substrate sample) that configures the liquid crystal cell 10, and a black matrix pattern sample (a BM substrate sample) having no color material of the CF sample have been prepared. Similarly to the liquid crystal panel 1 as illustrated in FIG. 1, the polarizer 12, the analyzer 13, and the biaxial retardation film 14 have adhered to the respective samples, thereby preparing three kinds of samples.

FIGS. 6A to 6I illustrate measurement results of these sample. FIGS. 6A to 6C illustrate measurement results of the panel samples, FIGS. 6D to 6F illustrate measurement results of the CF substrate sample, and FIGS. 6F to 6H illustrate measurement results of the BM substrate sample.

FIGS. 6A to 6I illustrate features of the light distribution characteristic in an image view to facilitate understanding.

FIGS. 6A, 6D, and 6G in the upper stage illustrate measurement results of a case where a direction of beam light is at polar angle 30 degrees and azimuth angle 0 degrees. In the panel sample, there appear a high leakage-luminance region of a circular shape and a crescent shape (linear shape) centered about polar angle 30 degrees and azimuth angle 0 degrees, and two intermediate leakage-luminance regions spreading in an elliptical shape on upper side and lower side. In the CF substrate sample, there appears a high leakage-luminance region of a crescent shape centered about polar angle 30 degrees and azimuth angle 0 degrees, and two intermediate leakage-luminance regions spreading in an elliptical shape on upper side and lower side. Further, in the BM substrate sample, there appears only a high leakage-luminance region of a crescent shape centered about polar angle 30 degrees and azimuth angle 0 degrees.

From the above, it can be understood that BM diffraction leakage light attributable to diffracted light of the BM substrate forms a high leakage-luminance region of a crescent shape, CF color-material scattering leakage light attributable to scattering light of a color material of the color filter forms upper and lower intermediate leakage-luminance regions spreading in the elliptical shape, and liquid crystal layer scattering leakage light attributable to scattering light by the liquid crystal layer forms a high leakage-luminance region centered around a direction of beam light.

FIGS. 6B, 6E, an 6H in the middle stage illustrate measurement results of a case where a beam light incident direction is at polar angle 30 degrees and azimuth angle 90 degrees. In the BM substrate sample (FIG. 6H), BM diffraction leakage light forms a high leakage-luminance region of a crescent shape which slightly spreads to the left-and-right direction. However, a high leakage-luminance region is not observed in the panel sample and the CF substrate sample, and an influence to the whole is low. Further, while the CF color-material scattering leakage light spreads uniformly, luminance in this region is low, and upper and lower intermediate leakage-luminance regions spreading in the elliptical shape are not observed. Liquid crystal layer scattering leakage light forms a high leakage light region of a circular shape centered around a direction of beam light, in a similar manner to the case of polar angle 30 degrees and azimuth angle 0 degrees.

FIGS. 6C, 6F, and 6I in the lower stage illustrate measurement results of a case where the light incident direction is the same as that in the middle stage at polar angle 30 degrees and azimuth angle 90 degrees, and each sample is reversed around the up-and-down direction as an axis. As illustrated in FIG. 6I, in the BM substrate sample (FIG. 6I), BM diffraction leakage light forms a high leakage-luminance region of a crescent shape which slightly spreads to the left-and-right direction. However, a high leakage-luminance region is not observed in the panel sample and the CF substrate sample, and an influence to the whole is low. In the CF substrate sample (FIG. 6F), left and right intermediate-level leakage-luminance regions spreading in the elliptical shape appear due to the CF color-material scattering leakage light, and luminance in this region is about the same as that in the intermediate leakage-luminance region in FIG. 6D. Liquid crystal layer scattering leakage light forms a high leakage light region of a circular shape centered about a direction of beam light, in a similar manner to that in FIGS. 6A and 6B.

Table in FIG. 7 summarizes the above characteristics.

Liquid crystal layer scattering leakage light is radiated in a concentric circular shape centered about the incident light ray, without depending on a polarization direction and the azimuth angle of the incident light. As factors of a mechanism that generates such a phenomenon, scattering by small liquid crystal domains at different orientation angles and rotation of a polarization direction are considered.

Further, the CF color-material scattering leakage light is widely radiated in the azimuth orthogonal to a polarization direction of the incident light. Further, existence of a leakage luminance component not dependent on the installation direction of the CF substrate sample and on the angle of beam light are considered the candidates.

Finally, it is considered that BM diffraction leakage light uniquely spreads around the incident angle, by receiving influences from a diffraction pattern due to the BM opening and from a polarization direction due to a propagation direction of diffracted light.

Next, in order to clarify in further detail a generation mechanism of scattering leakage light, the inventor has studied characteristics of BM diffraction leakage light generated from the BM substrate sample which has the least configuration members.

FIGS. 8A to FIGS. 10D illustrate spectral luminance distributions of diffraction leakage light measured by a view angle measuring device installed with a BM substrate sample, while appropriately rotating the BM substrate sample by 90 degrees, appropriately reversing the front and rear sides, and adding a biaxial retardation film. FIGS. 8A to 8D respectively indicate a condition A to a condition D concerning the absorption axis of the polarizer, a BM pattern (a longitudinal direction of the BM opening), and the absorption axis of the analyzer. FIGS. 9A to 9D and FIGS. 10A to 10D also indicate these items. By rotating and reversing the BM substrate sample, the longitudinal direction of the BM opening (a BM pattern) and the angle of polarization incident to the BM opening in these conditions are different.

FIGS. 8A to 8D illustrate measurement results of a case where the BM substrate sample has a polarization plate configuration without the biaxial retardation film (corresponding to the biaxial retardation film 14 in FIG. 1), and a direction of beam light (a beam ray) is at polar angle 30 degrees and azimuth angle 270 degrees. In FIGS. 8A to 8D, it has become clear that although diffraction leakage light in the direction orthogonal to the incident polarization (the luminance region of diffraction leakage light spreading to the left-and-right direction) is clearly observed, diffraction leakage light in the direction parallel to the incident polarization is not clearly observed and is low to the extent of being hidden by noise. Further, in FIGS. 8A to 8D, the height of luminance in the luminance region of diffraction leakage light spreading to the left-and-right direction has become in the relationship of the condition A>the condition C>the condition B>the condition D. Accordingly, in the case of the condition A, that is, in the case where a spreading direction of diffraction leakage light which is clearly observed (the left-and-right direction) coincides with a direction to which diffraction becomes strong due to the BM pattern being longitudinal (the left-and-right direction), luminance of diffraction leakage light becomes higher.

FIGS. 9A to 9D illustrate measurement results of a case where the BM substrate sample has a polarization plate configuration without the biaxial retardation film, and a direction of beam light is at polar angle 30 degrees and azimuth angle 180 degrees. In FIGS. 9A to 9D, it has become clear that although diffraction leakage light in the direction orthogonal to the incident polarization (the luminance region of diffraction leakage light spreading to the up-and-down direction) is clearly observed, diffraction leakage light in the direction parallel to the incident polarization is not clearly observed and is low to the extent of being hidden by noise. Further, in FIGS. 9A to 9D, the height of luminance in the diffraction-leakage-luminance region spreading to the up-and-down direction has become in the relationship of the condition D>the condition B>the condition C>the condition A. Accordingly, in the case of the condition D, that is, in the case where a spreading direction of diffraction leakage light which is clearly observed (the up-and-down direction) coincides with a direction to which diffraction becomes strong due to the BM pattern being laterally long (the left-and-right direction), luminance of diffraction leakage light becomes higher.

Summarizing the results in FIGS. 8A to 8D and FIGS. 9A to 9D, it has become clear that in the BM substrate sample to which the biaxial retardation film is not attached, luminance of BM diffraction leakage light has dependency on the combination of the incident azimuth angle and the incident polarization direction. Specifically it has become clear that strong diffraction leakage light appears in the direction orthogonal to the electric field amplitude direction of the p wave. Further, it has become clear that in the case where a spreading direction of diffraction leakage light that is clearly observed coincides with a direction to which diffraction becomes strong due to the longitudinal direction of the BM pattern, BM diffraction leakage light becomes stronger.

FIGS. 10A to 10D illustrate measurement results of a case where the BM substrate sample to which the biaxial retardation film (NAZ) is attached as illustrated in FIG. 1 is reversed and is rotated by 90 degrees. A direction of beam light is set such that polar angle is 30 degrees and azimuth angle is 270 degrees. According to the condition A and the condition D, the biaxial retardation film (NAZ) is positioned on the light source side, and according to the condition B and the condition C, the biaxial retardation film (NAZ) is positioned on the view angle measuring device side.

In FIGS. 10A to 10D, the height of luminance of BM diffraction leakage light spreading to the left-and-right direction is in the relationship of the condition B>the condition A≥the condition C>the condition D. In the condition A that the biaxial retardation film (NAZ) is arranged on the light source side, luminance of the BM diffraction leakage light can be set lower than that in the condition B that the biaxial retardation film (NAZ) is arranged on the view angle measuring device side. Similarly, in the condition D that the biaxial retardation film (NAZ) is arranged on the light source side, luminance of BM diffraction leakage light can be set lower than that in the condition C that the biaxial retardation film (NAZ) is arranged on the view angle measuring device side.

When comparing the results indicated in FIGS. 10A to 10D with the results indicated in FIGS. 8A to 8D, in the condition A and the condition D in FIGS. 10A to 10D in which the biaxial retardation film (NAZ) is arranged on the light source side, dependency on the incident polarization similar to that in the condition A and the condition D in FIGS. 8A to 8D is indicated. However, in the condition B and the condition C in FIGS. 10A to 10D in which the biaxial retardation film (NAZ) is arranged on the side of the view angle measuring device, dependency on the incident polarization different from that in the condition B and the condition C in FIGS. 8A to 8D is indicated. This is considered because a polarization direction of diffracted light receives influences of the biaxial retardation film.

Figure 11:
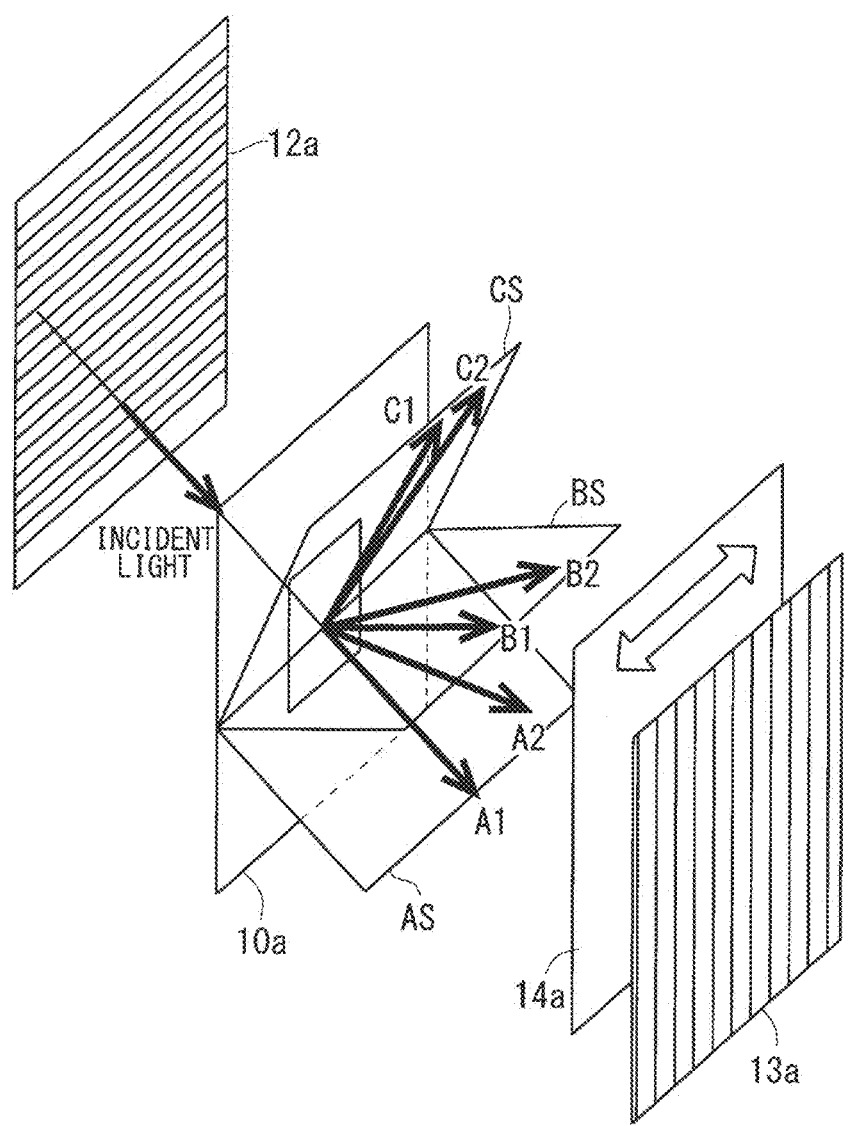
FIG. 11 is a perspective view illustrating an analyzer transmission light model of diffracted light on a diffraction surface inclined to the incident surface.

FIGS. 11 to 14D illustrate generation models of BM diffraction leakage light that are considered by taking the above results into account. FIG. 11 is a model view illustrating a state of generation and propagation of diffracted light. According to this model, the absorption axis of the polarizer 12a on the backlight 2 side is in the left-and-right direction, and the absorption axis of the analyzer 13a is in the up-and-down direction. A direction of the slow axis on the cross section of the refractive index ellipsoid that works on the light proceeding in the front direction in the biaxial retardation film 14a is the left-and-right direction as indicated by a white arrow.

Hereinafter, diffracted light A1 to C2 on diffracted light-ray propagation planes AS, BS, and CS (hereinafter, abbreviated as planes AS, BS, and CS) will be considered. The plane AS is a plane including the extension line of the incident light ray, the plane BS is perpendicular to the panel surface 10a, and the plane CS is inclined to a direction opposite to the extension line of the incident light ray. The diffracted light A1 is diffracted light that propagates to the same direction as the incident light ray direction. The diffracted light A1, B1, and C1 propagate in the plane perpendicular to the panel surface 10a and the plane BS. The diffracted light A1 and A2 propagate in the plane AS, the diffracted light B1 and B2 propagate in the plane BS, and the diffracted light C1 and C2 propagate in the plane CS.

According to the model illustrated in FIG. 11, because the absorption axis of the polarizer 12a on the backlight 2 side is in the left-and-right direction, a polarization direction (an electric field amplitude direction) of beam light (incident light ray) incident to the panel surface 10a is in the up-and-down direction orthogonal to the left-and-right direction and the incident light (a light ray direction) (p wave). According to the Huygens-Fresnel principle in the wave optics, when light enters the panel surface 10a, an elementary wave in a spherical wave shape spreads uniformly in all directions as diffracted light from the panel surface 10a. Therefore, a spherical wave spreads equally in the planes AS, BS, and CS, and a spectral luminance distribution is generated by interference.

FIGS. 12A to 12F are views illustrating a relationship among the absorption axis of the polarizer 12a, the absorption axis of the analyzer 13a, the slow axis of the biaxial retardation film 14a, a polarization directions of the diffracted light A1 to C2, and a polarization direction of diffracted light after passing through the biaxial retardation film 14a that are viewed from propagation directions of the diffracted light A1 to C2 generated in the panel surface 10a. A thin black line in the drawing indicates the absorption axis of the polarizer 12a, a thick black line indicates the absorption axis of the analyzer 13a, a white arrow indicates the slow axis of the biaxial retardation film 14a, a black broken line arrow indicates a polarization direction of diffracted light before passing through the biaxial retardation film 14a, and a black solid line arrow indicates a polarization direction of diffracted light after passing through the biaxial retardation film 14a.

Figure 12A:
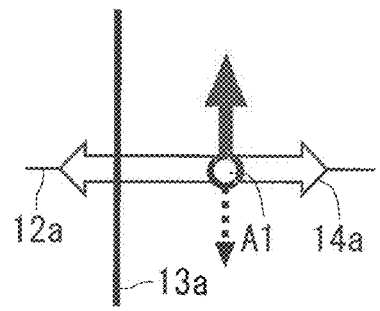
FIGS. 12A to 12F are views illustrating relationships of various kinds of directions viewed from a propagation direction of diffracted light in an analyzer transmission light model.

First, in the case of the diffracted light A1, as illustrated in FIG. 12A, the absorption axis of the polarizer 12a is in the left-and-right direction, and the absorption axis of the analyzer 13a is in the up-and-down direction orthogonal to the left-and-right direction. Further, because a polarization direction of the incident light ray is in the up-and-down direction, a polarization direction of the diffracted light A1 generated in the panel surface 10a (the black broken line arrow) becomes perpendicular to the plane AS. Further, because a polarization direction of the diffracted light A1 is orthogonal to a direction of the slow axis indicated by the white arrow of the biaxial retardation film 14a, a polarization direction of the diffracted light A1 after passing through the biaxial retardation film 14a (the black solid line arrow) is perpendicular to the plane AS, like a polarization direction of the diffracted light A1 before passing through the biaxial retardation film 14a. Accordingly, a polarization direction of the diffracted light A1 after passing through the biaxial retardation film 14a (the black solid line arrow) becomes parallel to the absorption axis of the analyzer 13a, so that the diffracted light A1 is absorbed by the analyzer 13a. As a result, transmittance becomes small, and the leakage light reduces.

Figure 12B:
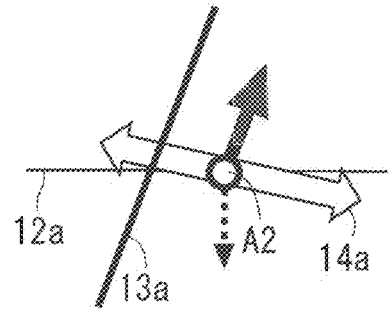

In the case of the diffracted light A2, the absorption axis of the analyzer 13a appears inclined from the plane AS when viewed from the diffracted light A2, as illustrated in FIG. 12B. Further, because a polarization direction of the incident light ray is in the up-and-down direction, a polarization direction of the diffracted light A2 generated in the panel surface 10a (the black broken line arrow) becomes perpendicular to the plane AS, like the diffracted light A1. From the above, it is also considered that the leakage light is generated because a polarization direction of the diffracted light A2 is not parallel to the absorption axis of the analyzer 13a.

However, a polarization direction of the diffracted light A2 is rotated to be aligned in the absorption axis direction of the analyzer 13a by the function of the ½ wavelength plate of the biaxial retardation film 14a. That is, a polarization direction of the diffracted light A2 after passing through the biaxial retardation film 14a (the black solid line arrow) becomes parallel to the absorption axis of the analyzer 13a, so that the diffracted light A2 is absorbed by the analyzer 13a. As a result, transmittance becomes small, and the leakage light reduces. Because a polarization direction of the diffracted light A2 becomes the same as a polarization direction of straight proceeding light, transmittance of the diffracted light A2 between the NAZ polarization plates becomes a value near transmittance of straight proceeding light between the polarization plates via the biaxial retardation film 14a.

Figure 12C:
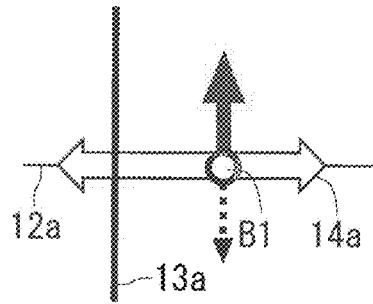

In the case of the diffracted light B1, like the diffracted light A1, the absorption axis of the polarizer 12a is in the left-and-right direction, and the absorption axis of the analyzer 13a is in the up-and-down direction orthogonal to the left-and-right direction, as illustrated in FIG. 12C. Further, because a polarization direction of the incident light ray is in the up-and-down direction, a polarization direction of the diffracted light B1 generated in the panel surface 10a (the black broken line arrow) becomes perpendicular to the plane BS, like the diffracted light A1. Further, because a polarization direction of the diffracted light B1 is orthogonal to a direction of the slow axis indicated by the white arrow of the biaxial retardation film 14a, a polarization direction of the diffracted light B1 after passing through the biaxial retardation film 14a (the black solid line arrow) remains parallel to the absorption axis of the analyzer 13a. As a result, the diffracted light B1 is absorbed, transmittance becomes small, and the leakage light reduces.

Figure 12D:
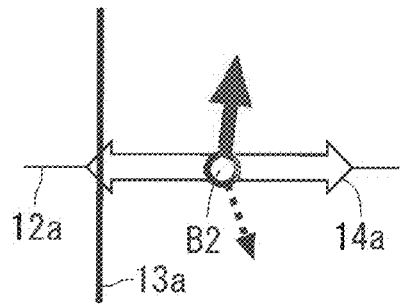

In the case of the diffracted light B2, like the diffracted light A1, the absorption axis of the polarizer 12a is in the left-and-right direction, and the absorption axis of the analyzer 13a is in the up-and-down direction orthogonal to the left-and-right direction, as illustrated in FIG. 12D. Although a polarization direction of the incident light ray is in the up-and-down direction, a polarization direction of the diffracted light B2 generated in the panel surface 10a (the black broken line arrow) is not perpendicular to the plane BS and has an inclination.

Although a polarization direction of the diffracted light B2 is rotated by the function of the ½ wavelength plate of the biaxial retardation film 14a, the slow axis of the biaxial retardation film 14a is in the left-and-right direction in the drawing. Therefore, a polarization direction of the diffracted light B2 after passing through the biaxial retardation film 14a (the black solid line arrow) does not become parallel to the absorption axis of the analyzer 13a. Therefore, transmittance is large, and leakage is generated.

Figure 12E:
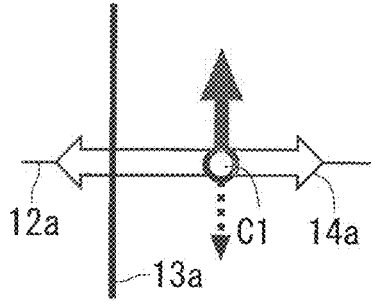

In the case of the diffracted light C1, like the diffracted light A1, the absorption axis of the polarizer 12a becomes in the left-and-right direction, and the absorption axis of the analyzer 13a becomes in the up-and-down direction orthogonal to the left-and-right direction, as illustrated in FIG. 12E. Further, because a polarization direction of the incident light ray is in the up-and-down direction, a polarization direction of the diffracted light C1 generated in the panel surface 10a (the black broken line arrow) becomes perpendicular to the plane CS, like the diffracted light A1. Further, because a polarization direction of the diffracted light C1 is orthogonal to a direction of the slow axis indicated by the white arrow of the biaxial retardation film 14a, a polarization direction of the diffracted light C1 after passing through the biaxial retardation film 14a (the black solid line arrow) remains parallel to the absorption axis of the analyzer 13a. As a result, the diffracted light C1 is absorbed, transmittance becomes small, and the leakage light reduces.

Figure 12F:
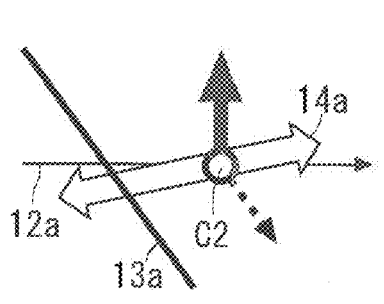

In the case of the diffracted light C2, the absorption axis of the analyzer 13a appears inclined from the plane CS when viewed from the diffracted light C2, as illustrated in FIG. 12F. Although a polarization direction of the incident light ray is in the up-and-down direction, a polarization direction of the diffracted light C2 generated in the panel surface 10a (the black broken line arrow) is not perpendicular to the plane CS and has a larger inclination from the up-and-down direction of the plane CS than the inclination illustrated in FIG. 12D.

Although a polarization direction of the diffracted light C2 is rotated by the function of the ½ wavelength plate of the biaxial retardation film 14a, the slow axis of the biaxial retardation film 14a is in the left-and-right direction in the drawing. Therefore, a polarization direction of the diffracted light C2 after passing through the biaxial retardation film 14a (the black solid line arrow) is inclined from the absorption axis of the analyzer 13a. Because the angle of this inclination is larger than the angle of the inclination illustrated in FIG. 12D, transmittance is larger, leakage is more generated.

Figure 13:
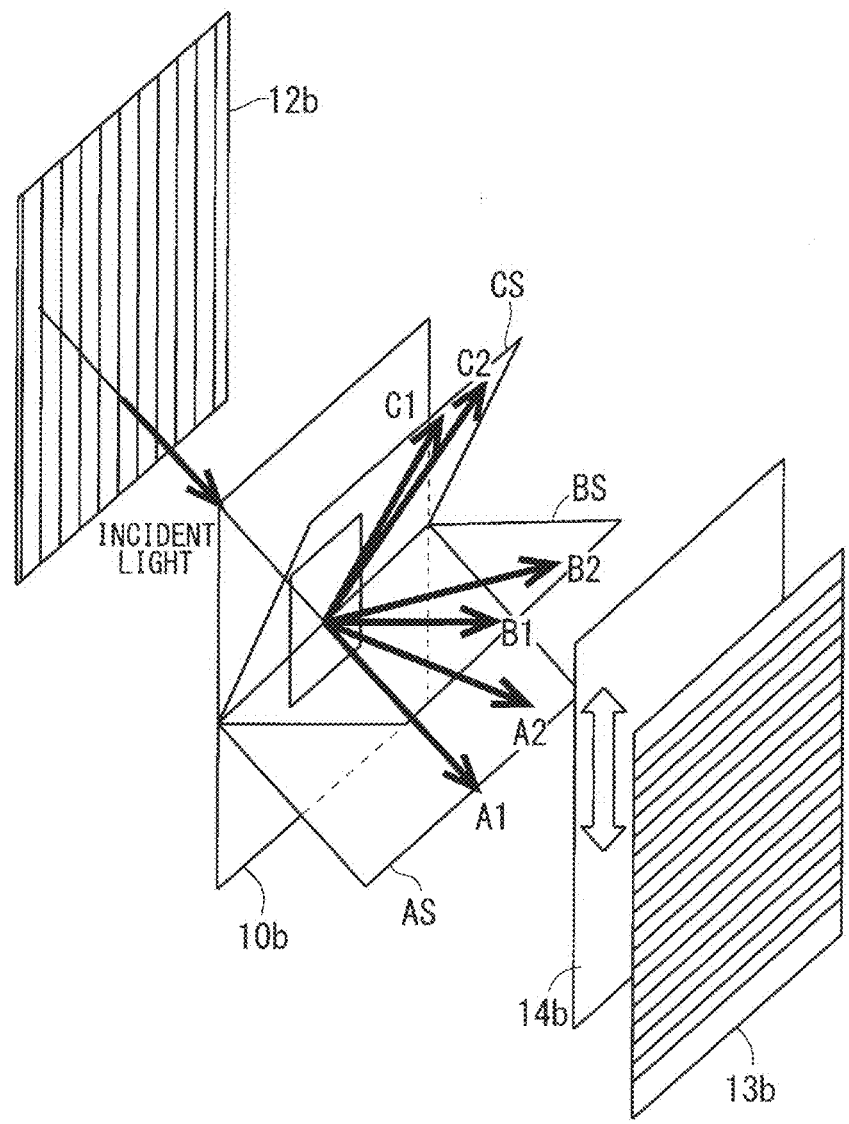
FIG. 13 is a perspective view illustrating an analyzer transmission light model of diffracted light on a diffraction surface inclined to the incident surface.

FIG. 13 is a model view illustrating a state of generation and propagation of diffracted light. According to this model, the absorption axis of the polarizer 12b on the backlight 2 side is in the up-and-down direction, and the absorption axis of the analyzer 13b is in the left-and-right direction. A direction of the slow axis on the cross section of the refractive index ellipsoid that works on the light proceeding in the front direction in the biaxial retardation film 14b is the up-and-down direction as indicated by a white arrow. Hereinafter, like in FIG. 11, the diffracted light A1 to C2 on the three planes (AS, BS, and CS) will be considered.

According to the model illustrated in FIG. 13, because the absorption axis of the polarizer 12b on the backlight 2 side is in the up-and-down direction, a polarization direction (an electric field amplitude direction) of beam light (incident light ray) incident to the panel surface 10b becomes in the left-and-right direction orthogonal to the up-and-down direction and the incident light (a light ray direction) (s wave).

Similarly to FIGS. 12A to 12F, FIGS. 14A to 14F are views illustrating a relationship among the absorption axis of the polarizer 12b, the absorption axis of the analyzer 13b, the slow axis of the biaxial retardation film 14b, polarization directions of the diffracted light A1 to C2, and a polarization direction of diffracted light after passing through the biaxial retardation film 14b that are viewed from propagation directions of the diffracted light A1 to C2 generated in the panel surface 10b. A thin black line in the drawing indicates the absorption axis of the polarizer 12b, a thick black line indicates the absorption axis of the analyzer 13b, a white arrow indicates the slow axis of the biaxial retardation film 14b, a black broken line arrow indicates a polarization direction of diffracted light before passing through the biaxial retardation film 14b, and a black solid line arrow indicates a polarization direction of diffracted light after passing through the biaxial retardation film 14b.

Figure 14A:
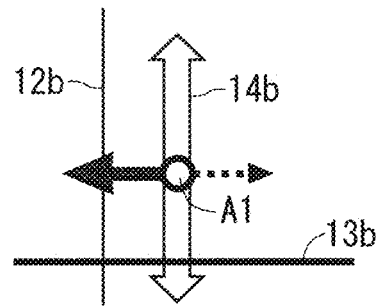
FIGS. 14A to 14F are views illustrating relationships of various kinds of directions viewed from a propagation direction of diffracted light in an analyzer transmission light model.

First, in the case of the diffracted light A1, as illustrated in FIG. 14A, the absorption axis of the analyzer 13b is in the left-and-right direction, and the absorption axis of the polarizer 12b becomes in the up-and-down direction orthogonal to the left-and-right direction. Because a polarization direction of the incident light ray is in the left-and-right direction, a polarization direction of the diffracted light A1 generated in the panel surface 10b (the black broken line arrow) becomes parallel to the plane AS. Further, because a polarization direction of the diffracted light A1 is orthogonal to a direction of the slow axis indicated by the white arrow of the biaxial retardation film 14b, a polarization direction of the diffracted light A1 after passing through the biaxial retardation film 14b (the black solid line arrow) is parallel to the plane AS, like a polarization direction of the diffracted light A1 before passing through the biaxial retardation film 14b. Accordingly, a polarization direction of the diffracted light A1 after passing through the biaxial retardation film 14b (the black solid line arrow) becomes parallel to the absorption axis of the analyzer 13b, so that the diffracted light A1 is absorbed by the analyzer 13b. As a result, the diffracted light A1 is absorbed, transmittance becomes small, and the leakage light reduces.

Figure 14B:
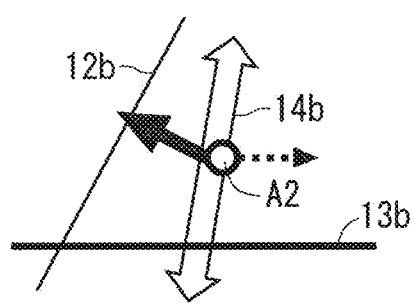

In the case of the diffracted light A2, the absorption axis of the polarizer 12b appears inclined from the plane AS when viewed from the diffracted light A2, as illustrated in FIG. 14B. Because a polarization direction of the incident light ray is in the left-and-right direction, a polarization direction of the diffracted light A2 generated in the panel surface 10b (the black broken line arrow) becomes parallel to the plane AS. From the above, it is also considered that the leakage light is not generated because a polarization direction of the diffracted light A2 is parallel to the absorption axis of the analyzer 13b.

However, a polarization direction of the diffracted light A2 is rotated by the function of the ½ wavelength plate of the biaxial retardation film 14b. By this rotation, a polarization direction of the diffracted light A2 after passing through the biaxial retardation film 14b (the black solid line arrow) does not become parallel to the absorption axis of the analyzer 13b. Therefore, transmittance is large, and leakage is generated. Because a polarization direction of the diffracted light A2 becomes the same as a polarization direction of straight proceeding light, transmittance of the diffracted light A2 between the NAZ polarization plates becomes a value near transmittance of straight proceeding light between the polarization plates without a biaxial retardation film.

Figure 14C:
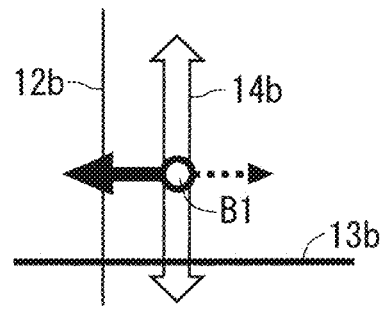

In the case of the diffracted light B1, like the diffracted light A1, as illustrated in FIG. 14C, the absorption axis of the analyzer 13b is in the left-and-right direction, and the absorption axis of the polarizer 12b becomes in the up-and-down direction orthogonal to the left-and-right direction. Because a polarization direction of the incident light ray is in the left-and-right direction, a polarization direction of the diffracted light B1 generated in the panel surface 10b (the black broken line arrow) becomes parallel to the plane BS, like the diffracted light A1. Further, because a polarization direction of the diffracted light B1 is orthogonal to a direction of the slow axis indicated by the white arrow of the biaxial retardation film 14b, a polarization direction of the diffracted light B1 after passing through the biaxial retardation film 14b (the black solid line arrow) remains parallel to the absorption axis of the analyzer 13b. As a result, the diffracted light B1 is absorbed, transmittance becomes small, and the leakage light reduces.

Figure 14D:
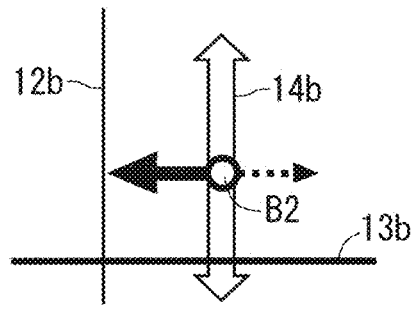

In the case of the diffracted light B2, like the diffracted light A1, as illustrated in FIG. 14D, the absorption axis of the analyzer 13b is in the left-and-right direction, and the absorption axis of the polarizer 12b becomes in the up-and-down direction orthogonal to the left-and-right direction. Because a polarization direction of the incident light ray is in the left-and-right direction, a polarization direction of the diffracted light B2 generated in the panel surface 10b (the black broken line arrow) becomes parallel to the plane BS, like the diffracted light A1. Further, because a polarization direction of the diffracted light B2 is orthogonal to a direction of the slow axis indicated by the white arrow of the biaxial retardation film 14b, a polarization direction of the diffracted light B2 after passing through the biaxial retardation film 14b (the black solid line arrow) remains parallel to the absorption axis of the analyzer 13b. As a result, the diffracted light B2 is absorbed, transmittance becomes small, and the leakage light reduces.

Figure 14E:
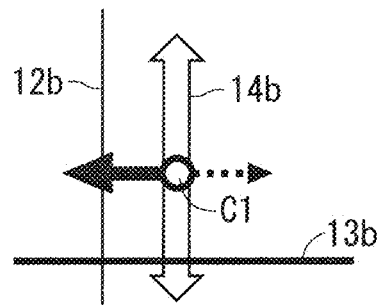

In the case of the diffracted light C1, like the diffracted light A1, as illustrated in FIG. 14E, the absorption axis of the analyzer 13b is in the left-and-right direction, and the absorption axis of the polarizer 12b becomes in the up-and-down direction orthogonal to the left-and-right direction. Because a polarization direction of the incident light ray is in the left-and-right direction, a polarization direction of the diffracted light C1 generated in the panel surface 10b (the black broken line arrow) becomes parallel to the plane CS, like the diffracted light A1. Further, because a polarization direction of the diffracted light C1 is orthogonal to a direction of the slow axis indicated by the white arrow of the biaxial retardation film 14b, a polarization direction of the diffracted light C1 after passing through the biaxial retardation film 14b (the black solid line arrow) remains parallel to the absorption axis of the analyzer 13b. As a result, the diffracted light C1 is absorbed, transmittance becomes small, and the leakage light reduces.

Figure 14F:
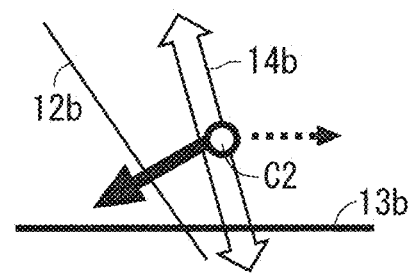

In the case of the diffracted light C2, the absorption axis of the polarizer 12b appears as being inclined from the plane CS when viewed from the diffracted light C2, as illustrated in FIG. 14F. Because a polarization direction of the incident light ray is in the left-and-right direction, a polarization direction of the diffracted light C2 generated in the panel surface 10b (the black broken line arrow) becomes parallel to the plane CS. From the above, it is also considered that the leakage light is not generated because a polarization direction of the diffracted light C2 is parallel to the absorption axis of the analyzer 13b.

However, a polarization direction of the diffracted light C2 is rotated by the function of the ½ wavelength plate of the biaxial retardation film 14b. By this rotation, a polarization direction of the diffracted light C2 after passing through the biaxial retardation film 14b (the black solid line arrow) does not become parallel to the absorption axis of the analyzer 13b. Therefore, transmittance is large, and leakage is generated.

Figure 15:
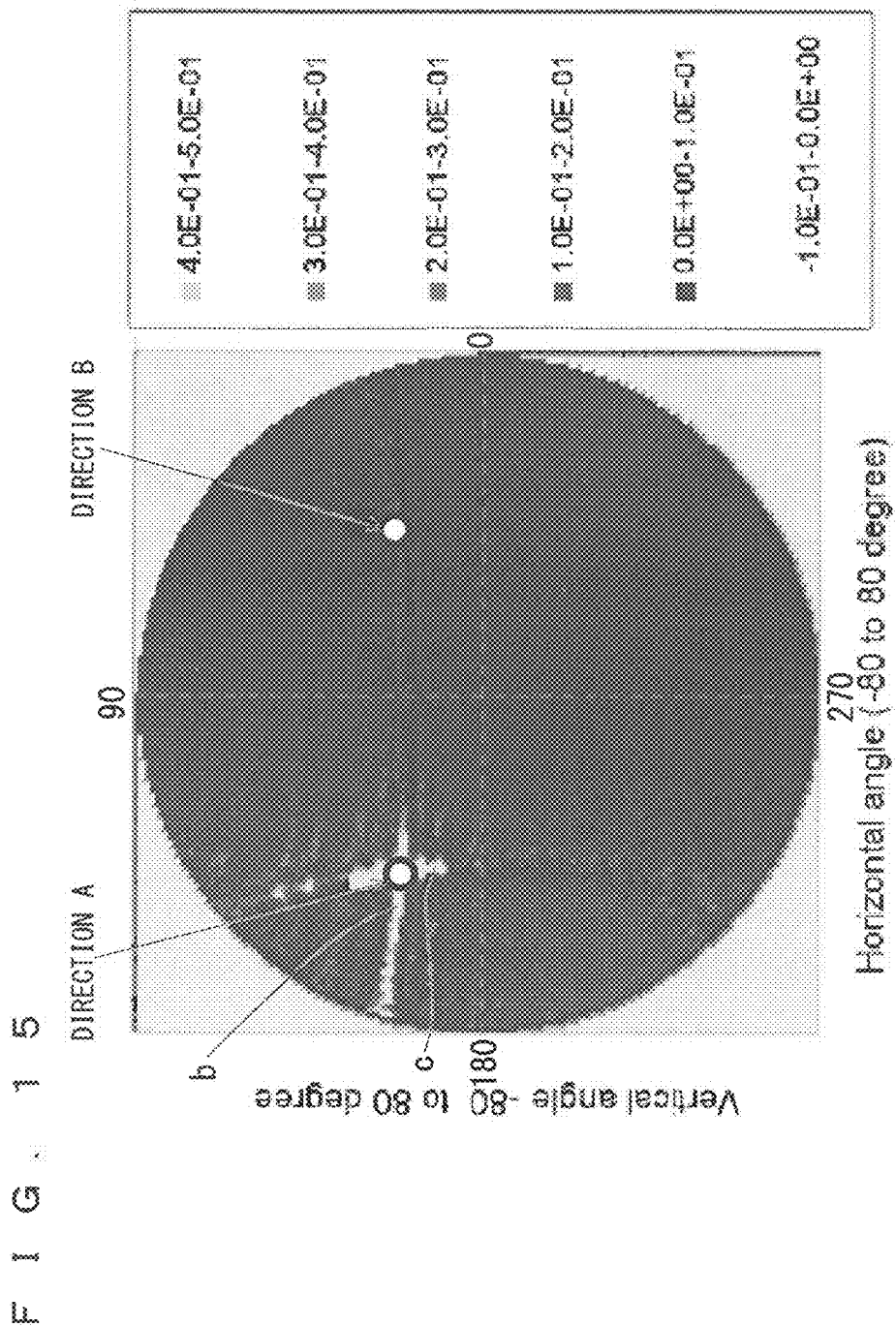
FIG. 15 is a contour view illustrating a relationship between luminance of diffracted light toward a direction A and an incident direction of incident beam ray.

FIG. 15 is a contour view illustrating generation efficiency distribution of diffracted light which is generated by incident beam rays proceeding to various directions and which propagates to a direction A as a measuring direction (polar angle 45 degrees and azimuth angle 156 degrees). Specifically, FIG. 15 illustrates luminance of diffracted light to the direction A per incident beam light flux, obtained by wave optics calculation. FIG. 15 indicates that luminance of diffracted light toward the direction A is determined by the diffracted light b spread to the left-and-right direction (FIG. 3B) and the diffracted light c spreads to the up-and-down direction (FIG. 3B), both the diffracted light b and c being generated by the beam incident light.

Figure 16:
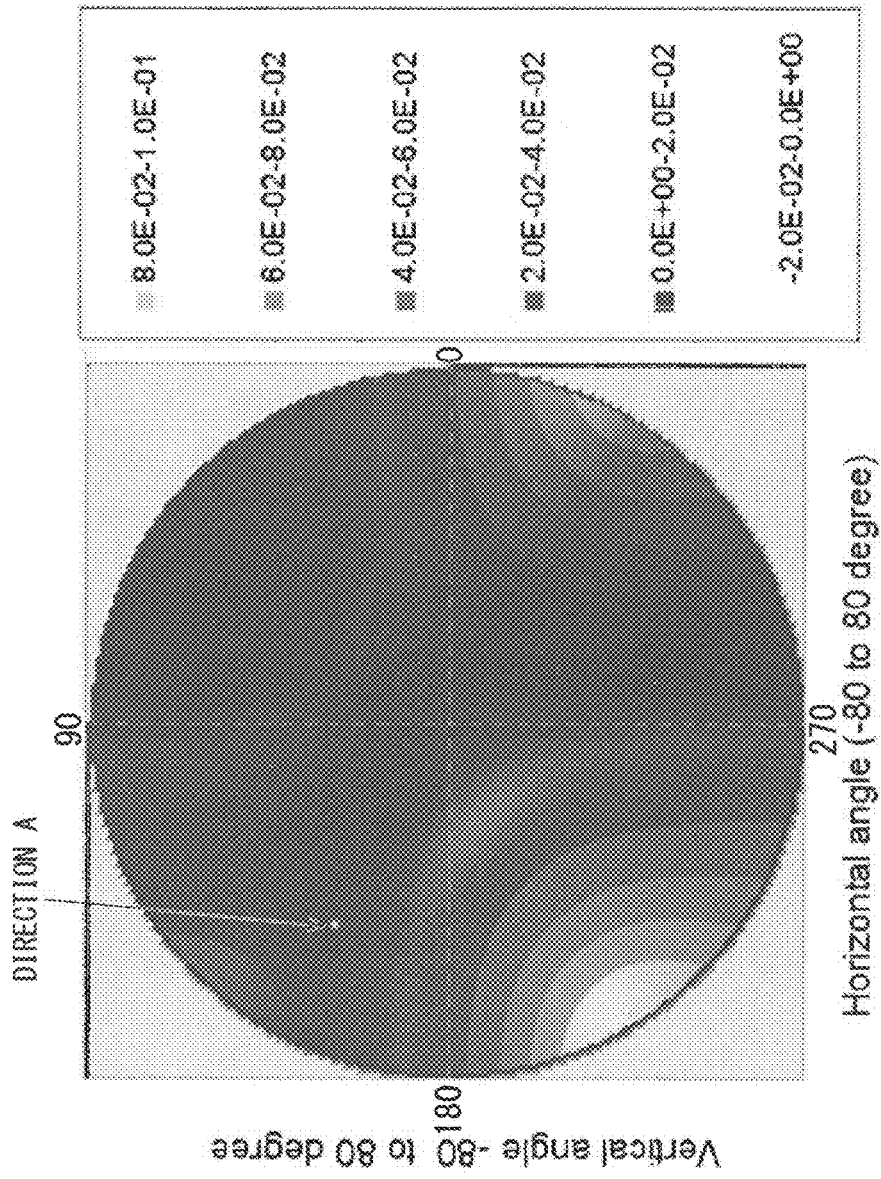
FIG. 16 is a contour view illustrating a relationship between analyzer transmittance of diffracted light toward the direction A and the incident direction of incident beam ray.

FIG. 16 is a contour view illustrating a relationship between the analyzer transmittance of the polarization passed through the polarizer 12b out of diffracted light proceeding to the direction A (polar angle 45 degrees and azimuth angle 156 degrees) and the incident angle of incident beam light. The result illustrated in FIG. 16 has been obtained by applying Jones matrix calculation to the models illustrated in FIG. 11 and FIG. 13.

Figure 17:
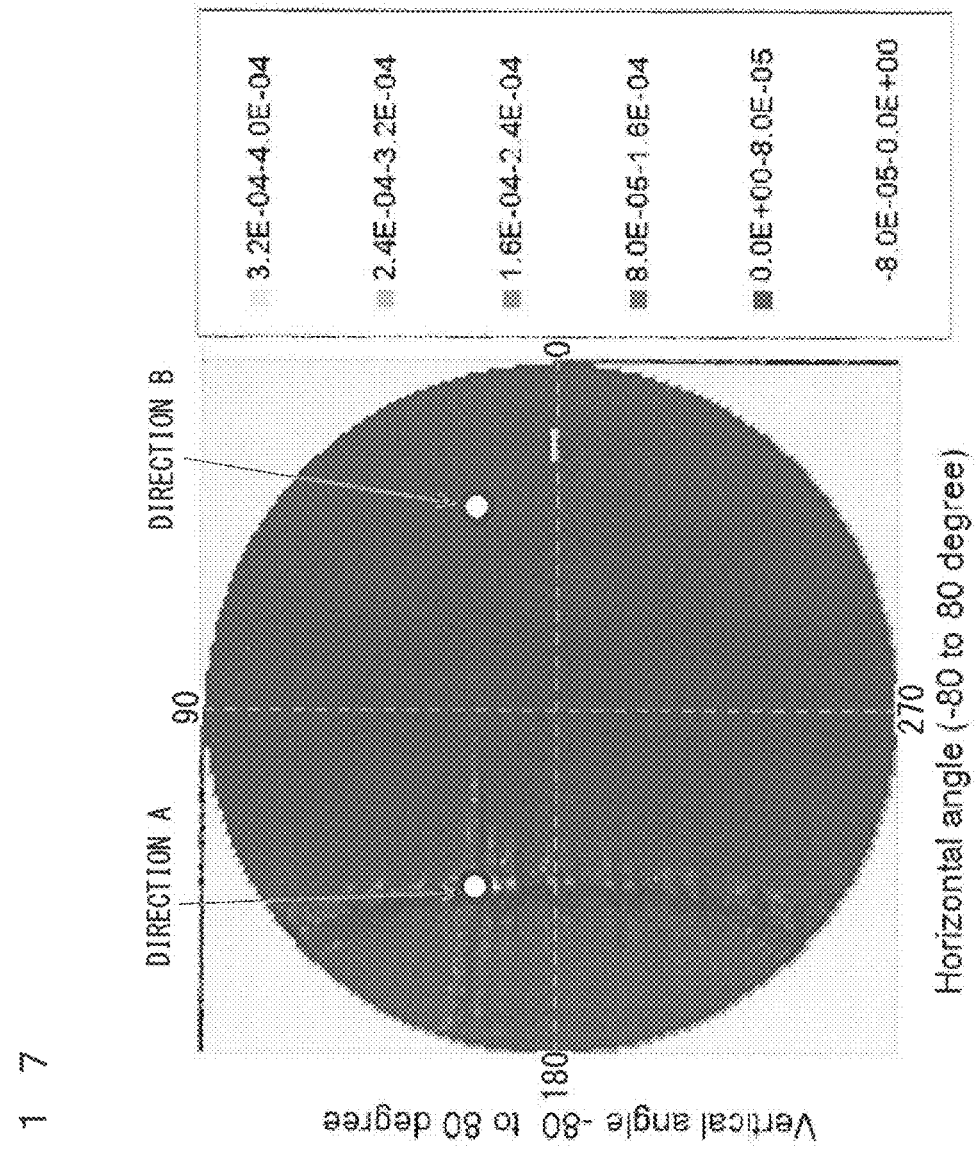
FIG. 17 is a contour view illustrating a relationship between luminance of diffraction leakage light toward the direction A and the incident direction of incident beam ray.

FIG. 17 is a contour view illustrating a relationship between luminance of diffraction leakage light proceeding to the direction A and the incident angle of incident beam light. FIG. 17 illustrates a distribution obtained by multiplying luminance efficiency of diffracted light illustrated in FIG. 15 to the incident light flux determined by a luminance distribution of incident beam light and transmittance of the polarizer 12b illustrated in FIG. 2, and by further multiplying transmittance of diffraction leakage light illustrated in FIG. 16, for each angle of incident beam light. This distribution is a distribution of luminance of diffraction leakage light, concerning diffracted light to the direction A generated by incident beam light incident to each direction. Luminance of diffraction leakage light proceeding to the direction A becomes a total sum of luminance of diffraction leakage by beam light in all directions.

From the results illustrated in FIG. 15 to FIG. 17, it can be understood that contribution of luminance of diffraction leakage by the diffracted light c which spreads to the up-and-down direction with respect to mainly the direction A is high. On the other hand, although the frequency of generation of the diffracted light b spreading to the left-and-right direction with respect to the direction A is high, because the analyzer transmittance in the left-and-right direction is low, contribution of incident beam light in the left-and-right direction is low. From the above, it has become clear that in order to suppress black level luminance by luminance of diffraction leakage in the direction A, it is effective to lower the backlight luminance in the region of a crescent shape, reduce the generation of diffraction light, change the angle of generated diffracted light, and lower the analyzer transmittance of diffracted light.

By taking the above facts into account, the liquid crystal display device according to preferred embodiments of the present invention described below are considered. The following description will be made to describe the preferred embodiments of the present invention, and the present invention is not limited to the following. In order to clarify the description, the following description and drawings will be appropriately omitted and simplified. Further, in order to clarify the description, redundant description will be omitted as needed. In each drawing, items attached with the same symbols will indicate similar elements, and description of such items will be appropriately omitted.

<First Preferred Embodiment>

A liquid crystal display device according to a first preferred embodiment will be described as a liquid crystal display device in the FFS mode. In the following, a liquid crystal display device having a preferred view angle characteristic in the case of being installed in the center console of an automobile will be described as an example, but the liquid crystal display device is not limited to this.

In the liquid crystal display device, it is desirable that a bright image in high contrast is visible from a driver seat and an assistant driver seat. Therefore, the liquid crystal display device is required to realize high luminance and high contrast in a region in a direction A as a upper left direction from the front (polar angle 45 degrees and azimuth angle 156 degrees, for example) and a direction B as a upper right direction (polar angle 45 degrees and azimuth angle 24 degrees, for example). That is, existence of a visibility angle at which low contrast is generated between the two directions is not desirable.

Figure 18:
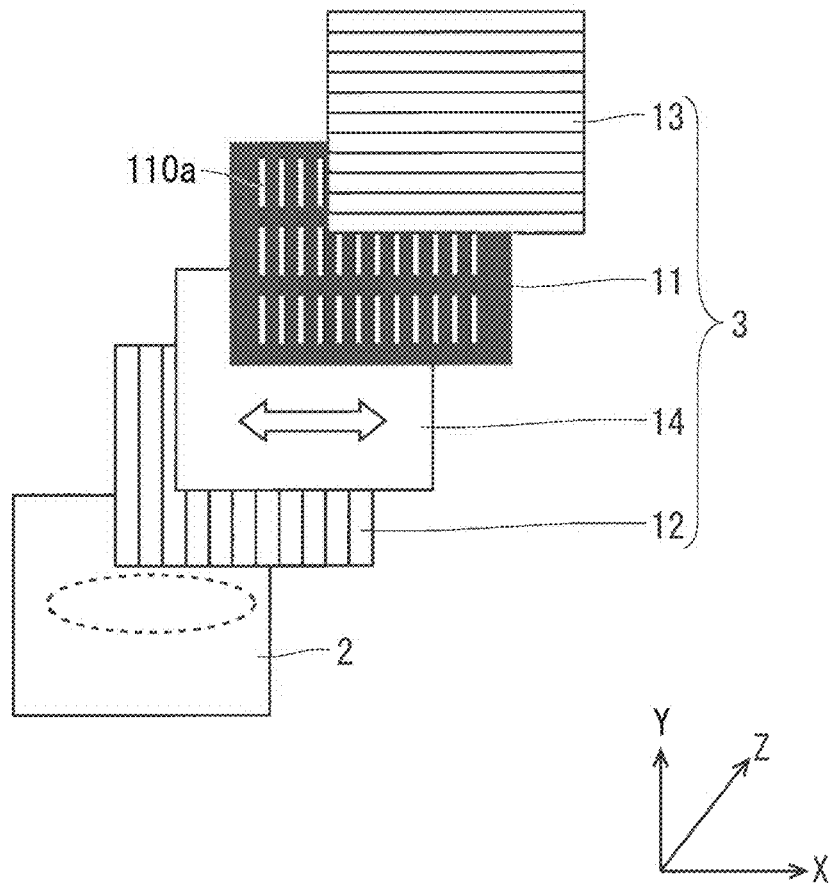
FIG. 18 is an exploded view illustrating a configuration of a liquid crystal display device according to a first preferred embodiment.

The liquid crystal display device according to the first preferred embodiment will be described with reference to FIG. 18 to FIG. 20. FIG. 18 is an exploded view illustrating a configuration of a liquid crystal display device in the FFS mode according to the first preferred embodiment. In the following description, the same symbols will be attached to configurations similar to those of the relevant device.

The liquid crystal display device according to the first preferred embodiment includes a liquid crystal panel 3, and the backlight 2. Like the above description, the backlight 2 has a light distribution characteristic that light distribution is wide in the left-and-right direction and narrow in the up-and-down direction, by using a laterally long lens-sheet and a diffusion sheet that are not illustrated.

The liquid crystal panel 3 includes the liquid crystal cell 11 in the FFS mode, the polarizer 12, the analyzer 13, and the biaxial retardation film 14. The liquid crystal cell 11 includes a black matrix having openings 110a through which light from the backlight 2 can pass, like the above liquid crystal cell 10. The opening 110a has a longitudinal shape which is long in the up-and-down direction, and a plurality of the openings 110a are laid out in the up-and-down and left-and-right directions as sub-pixels. Further, color filters in a blue color, a red color, and a green color not illustrated are provided in these openings 110a.

The polarizer 12 as a polarization plate is arranged on the light source side with respect to the liquid crystal cell 11. The absorption axis of the polarizer 12 is aligned to the up-and-down direction.

The analyzer 13 as a polarization plate is arranged on the observer side with respect to the liquid crystal cell 11 (the opposite side of the light source). The absorption axis of the analyzer 13 is aligned to the left-and-right direction orthogonal to the absorption axis of the polarizer 12. That is, the polarizer 12 and the analyzer 13 form crossed nicols. Because the absorption axis of the analyzer 13 is aligned to the left-and-right direction, the driver can visually confirm the image in the liquid crystal display device even when the driver wears a polarized sunglass.

The biaxial retardation film 14 is arranged between the polarizer 12 and the liquid crystal cell 11. The biaxial retardation film 14 is the positive biaxial retardation film that can adjust the optical axis direction and the phase difference value. In the case where the left-and-right direction of the liquid crystal cell 11 is X, the up-and-down direction is Y, and the front-and-back direction as a direction of the observer is Z, then refractive indexes nx, ny, and, nz in the X, Y, and Z directions have a relation of nx>ny, nz, and ny≠nz. For example, in the case where (nx−nz)/(nx−ny)=½ and the thickness of the biaxial retardation film 14 is d, a relationship of (nx−ny)×d=275 nm is established. Although the relationship of nx>ny is set above, the relationship may be changed to ny>nx. In the case where (ny−nz)/(ny−nx)=½ and the thickness of the biaxial retardation film 14 is d, it is sufficient when a relationship of (ny−nx)×d=275 nm is established.

Figure 19:
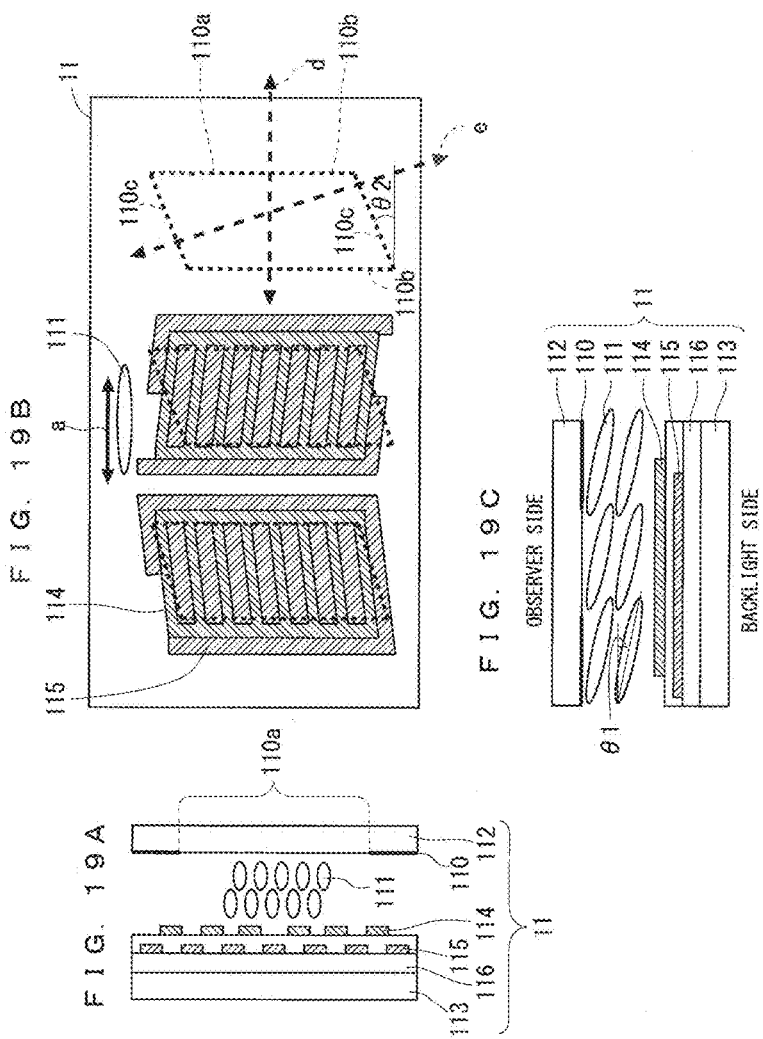
FIGS. 19A to 19C are views illustrating a configuration of a liquid crystal cell according to the first preferred embodiment.

FIG. 19 is a view schematically illustrating a configuration of the liquid crystal cell 11 in the FFS mode according to the first preferred embodiment. FIG. 19A is a sectional view of the liquid crystal cell 11 viewed from a side surface of the liquid crystal cell 11, FIG. 19B is a front view of the liquid crystal cell 11 viewed from the observer side, and FIG. 19C is a sectional view of the liquid crystal cell 11 viewed from a lower surface of the liquid crystal cell 11.

The liquid crystal cell 11 includes a black matrix 110, a liquid crystal layer in which liquid crystal molecules 111 are orientated, a first glass substrate 112 as a first transparent substrate, a second glass substrate 113 as a second transparent substrate, a pixel electrode 114, a common electrode 115, and an insulation film 116. The first glass substrate 112 is arranged on the observer side, the second glass substrate 113 is arranged between the first glass substrate 112 and the backlight 2, so that the second glass substrate 113 is arranged nearer the backlight 2 than the first glass substrate 112.

On the first glass substrate 112 on the observer side, the black matrix 110 is selectively formed by coating or depositing a thin film that absorbs light. The black matrix 110 is patterned, and has the openings 110a through which the light from the backlight 2 can pass. The light from the backlight 2 is diffracted after passing through the opening 110a (hereinafter, also referred to as a "BM opening 110a") of the black matrix 110, and turned into diffracted light d and e.

As illustrated in FIG. 19B, the BM opening 110a has a square shape which is long in the up-and-down direction. First edge parts 110b of the black matrix 110 that are adjacent to the left side and the right side of the BM opening 110a have a straight line shape extending to the up-and-down direction.

On the other hand, second edge parts 110c of the black matrix that are adjacent to the upper side and the lower side of the BM opening 110a have a straight line shape extending by inclination to mutually the same side in the left-and-right direction (in this case, in the counterclockwise direction). Accordingly, when viewed from the observer side (the analyzer 13 side), the end part of the right side of the second edge parts 110c adjacent to the upper side and the lower side of the BM opening 110a is positioned higher than the end part of the left side. An inclination angle θ2 of the second edge parts 110c is 10 degrees or above and 60 degrees or below, for example, and is preferably 10 degrees or above and 45 degrees or below. In the first preferred embodiment, the inclination angle θ2 is set to 20 degrees.

On the second glass substrate 113 on the backlight 2 side, there are formed the pixel electrode 114 and the common electrode 115 via the insulation film 116 such as a silicon oxide film, and the pixel electrodes 114 and the common electrode 115 are insulated by the insulation film 116. In this case, the pixel electrode 114 is formed by patterning transparent conductive films made of ITO or the like in a belt shape. In this case, the common electrode 115 is also formed by patterning a transparent conductive film made of ITO or the like in a belt shape. Accordingly, the pixel electrode 114 and the common electrode 115 have a plurality of belt-shaped portions extending to approximately the left-and-right direction, by inclination to the left-and-right direction at an angle of 5 degrees or above and 10 degrees or below.

In this case, belt-shaped portions of the pixel electrodes 114 are positioned on gaps of belt-shaped portions of the common electrodes 115 or belt-shaped portions of the common electrodes 115 are positioned on gaps of the belt-shaped portions of the pixel electrodes 114. According to such a configuration, in the BM opening 110a, thicknesses of the total ITO films viewed from the light advancing direction are set uniform.

As a laminated film of the first glass substrate 112 on the side nearest to the second glass substrate 113 and as a laminated film of the second glass substrate 113 on the side nearest to the first glass substrate 112, there are formed orientation films (not illustrated) that are rubbed to the left-and-right direction indicated by an arrow a. By the orientation films, the liquid crystal molecules 111 sandwiched between the first and second glass substrates 112 and 113 are orientated in the state of having a pretilt angle θ1 to the left-and-right direction in the plane perpendicular to the up-and-down direction, as illustrated in FIG. 19C. Accordingly, the end part on the right side out of the left side and the right side (a first side as one side) of the liquid crystal molecules 111 viewed from the observer side (the analyzer 13 side), is set closer to the backlight 2 than the end part of the left side (a second side as the other side).

The pretilt angle θ1 is 0.5 degrees or above and 5 degrees or below, for example, preferably the pretilt angle θ1 is about 0.5 degrees or above and 2.0 degrees or below. The liquid crystal molecules 111 are positive liquid crystals having positive dielectric anisotropy (Δ∈>0). In the liquid crystal display device according to the first preferred embodiment configured as described above, one side of the left side and the right side of the liquid crystal molecules 111 which is closer to the backlight 2 is the right side viewed from the observer side. One side of the right side and the left side of the second edge parts 110c which is positioned above is also the right side viewed from the observer side. The right side is set both in the former case and the latter case. That is, the end of part of a first side (the right side in this case) of the liquid crystal modules 111 is close to the backlight 2, and the end of part of the first side of the left side and the right side of the second edge parts 110c viewed from the analyzer 13 side is positioned above the end of part of a second side (the left side in this case).

Figure 20:
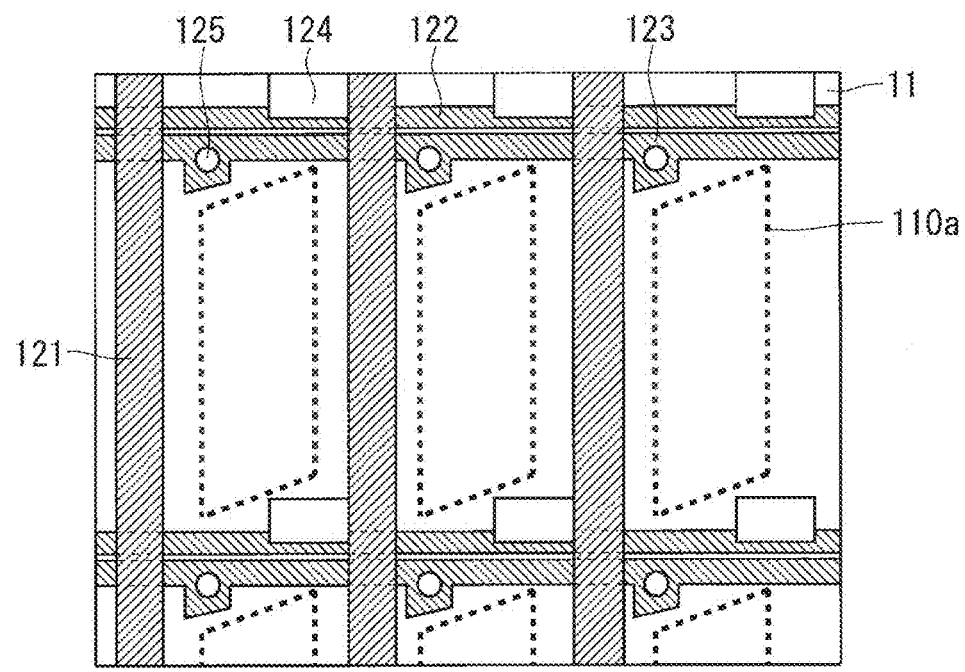
FIGS. 20 and 21 each are a plan view illustrating the configuration of the liquid crystal cell according to the first preferred embodiment.

FIG. 20 is a plan view illustrating the configuration of the liquid crystal cells 11 in the periphery of the BM opening 110a. As illustrated in FIG. 20, the liquid crystal cell 11 includes, in addition to the above configuration elements, a source wire 121 extending to the up-and-down direction (longitudinal direction), a gate wire 122 and a common wire 123 extending to the left-and-right direction (lateral direction), and a TFT (thin film transistor) 124 connected to the source wire 121 and the gate wire 122. In this case, a common electrode contact 125 that connects between the common electrode 115 and the common wire 123, and the TFT 124 are arranged on an outer side portion (a light-shielding portion) by avoiding the BM opening 110*a*. According to such a configuration, even when the second edge parts 110*c* are inclined from the left-and-right direction, reduction in the area of the BM opening 110*a* can be suppressed. Therefore, the opening ratio of the liquid crystal panel 3 (the liquid crystal cell 11) can be increased, and the white level luminance can be increased.

Figure 21:
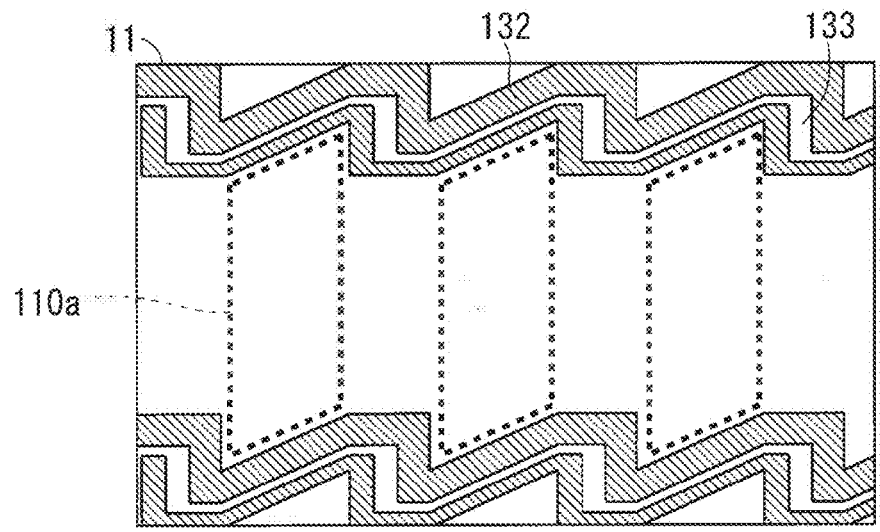

The gate wire 122 and the common wire 123 in FIG. 20 are in the straight line shape extending to the left-and-right direction, but the shape is not limited to this. For example, as illustrated in FIG. 21, the liquid crystal cell 11 may include at least one of the gate wire 132 and the common wire 133 that are in zigzag partially along the second edge parts 110*c* by avoiding the BM opening 110*a*. According to such a configuration, the area of the BM opening 110*a* can be increased and the white level luminance can be further increased, without decreasing the electric resistance of the gate wire 122 and the common wire 123.

<Operation in First Preferred Embodiment>

As described above, black level luminance corresponds to the sum of the leakage light luminance of straight proceeding light and luminance of various kinds of scattering leakage light.

Figure 22:
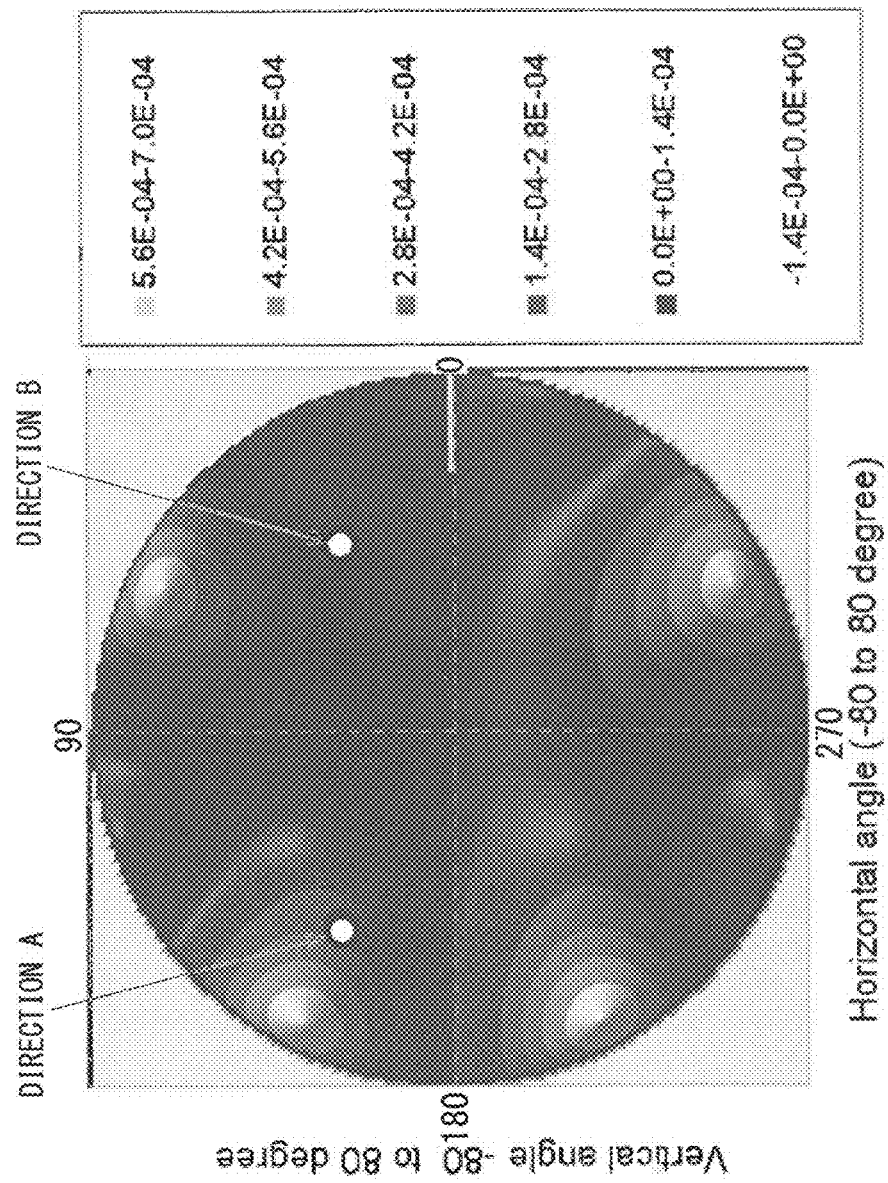
FIG. 22 is a contour view illustrating distribution of black level transmittance in a liquid crystal display device according to the first preferred embodiment.

First, the leakage luminance of straight proceeding light will be described. FIG. 22 is a view illustrating an angle distribution of transmittance of straight proceeding light calculated by the Jones matrix method in the liquid crystal display device in the FFS mode according to the first preferred embodiment. It is assumed here that there is no axis deviation in the polarizer 12, the analyzer 13, and the biaxial retardation film 14. Because the structure is symmetrical in the up-and-down direction, the distribution of transmittance is symmetrical in the up-and-down direction. However, the structure is asymmetrical in the left-and-right direction. In the drawing, the direction A is in polar angle 45 degrees and azimuth angle 156 degrees, and the direction B is in polar angle 45 degrees and azimuth angle 24 degrees. The transmittance in the direction A is higher than that in the direction B. The transmittance distribution to the left-and-right direction is asymmetrical because the liquid crystal molecules 111 have the pretilt angle θ1. It is assumed here that the pretilt angle θ1 is 1.5 degrees.

Next, scattering leakage light will be described. Among the various kinds of scattering leakage light (FIG. 7) in the liquid crystal display device according to the first preferred embodiment, luminance of liquid crystal layer scattering leakage light and the CF color-material scattering leakage light is the same as luminance in the relevant device. However, luminance of diffraction leakage light in the liquid crystal display device according to the first preferred embodiment is different from luminance of diffraction leakage light the relevant device.

The diffraction leakage light includes diffraction attributable to the BM opening 110*a* and diffraction attributable to the pixel electrode 114.

The pixel electrode 114 has a belt-shaped portion extending to the left-and-right direction, and generates diffracted light propagating to the up-and-down direction in order to produce distributions of the refractive index and transmittance in the BM opening 110*a*. However, as illustrated in FIG. 19, in the liquid crystal display device in the FFS mode according to the first preferred embodiment, by the patterning of the pixel electrodes 114 and the common electrode 115 (the patterning that the pixel electrodes 114 and the common electrodes 115 are respectively positioned on the gaps of the common electrodes 115 and the gaps of the pixel electrodes 114), distribution of the refractive index and transmittance in the BM opening 110*a* are offset. Therefore, the generation of diffracted light by the pixel electrode 114 is suppressed.

Next, diffracted light attributable to the BM opening 110*a* will be described. Diffracted light d attributable to the left side and the right side of the BM opening 110*a*, that is, attributable to the first edge parts 110*b* (FIG. 19B), is generated like in the relevant device. However, the sides of the upper side and the lower side of the BM opening 110*a*, that is, the second edge parts 110*c* are inclined to the left-and-right direction by the inclination angle θ2 (20 degrees in this case). Therefore, the propagation direction of diffracted light e (FIG. 19B) attributable to the second edge parts 110*c* are inclined from the up-and-down direction unlike in the relevant device. Therefore, the incident angle of incident beam light that generates a large amount of the diffracted light e which proceeds to the direction A is different from the incident angle in the relevant device.

Figure 23:
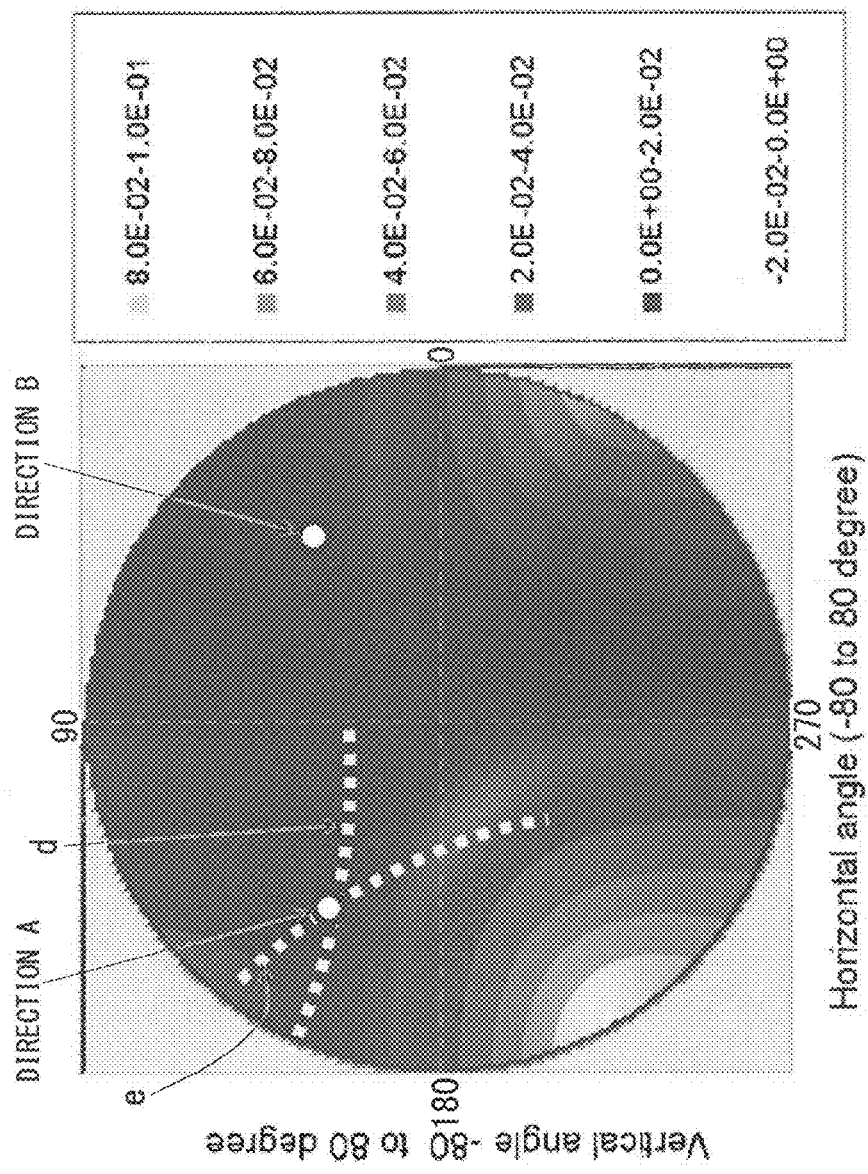
FIG. 23 is a contour view illustrating a relationship between a transmittance distribution of diffracted light toward the direction A and an incident angle of incident beam light in the liquid crystal display device according to the first preferred embodiment.

FIG. 23 illustrate a distribution of analyzer transmittance of diffracted light proceeding to the direction A out of diffracted light generated by beam light which is incident from various directions in the liquid crystal display device in the FFS mode according to the first preferred embodiment. The up-and-down and left-and-right directions in FIG. 23 are the proceeding directions of incident beam light. Brightness in FIG. 23 indicates analyzer transmittance of diffracted light proceeding to the direction A and generated from each point. Where luminance becomes whiter, transmittance is higher.

White broken lines in the drawing indicate angles of incident beam light having a large amount of the diffracted light d and e proceeding to the direction A. The diffracted light e eccentrically located in the direction A is inclined to the counterclockwise direction, as compared with the diffracted light c in the relevant device illustrated in FIG. 15. Accordingly, concerning the diffracted light e which is generated from the incident beam of a small incident polar angle and propagates to the direction A, the analyzer transmittance becomes low. On the other hand, concerning the diffracted light e which is generated from the incident beam light of a large incident polar angle and propagates to the direction A, the analyzer transmittance becomes high. However, by using the backlight 2 having the light distribution characteristic wider in the left-and-right direction than in the up-and-down direction as illustrated in FIG. 2, luminance of incident beam light in the range of a large incident polar angle becomes low. Therefore, the influence of the diffracted light e in the range can be suppressed. As a result of the above, black level luminance in the direction A (the luminance of diffraction leakage light) attributable to the diffracted light e extending to the up-and-down direction can be reduced.

The diffracted light d will be described next. The diffracted light d spreading to the left-and-right direction is similar to the diffracted light b in the relevant device. However, as described with reference to FIGS. 6A to 6I and FIG. 7, because transmittance of the diffracted light b which spreads to the left-and-right direction out of the diffracted light proceeding to the direction A is low, the influence to black level luminance in the direction A attributable to the diffracted light d spreading to the left-and-right direction is small.

According to the liquid crystal display device of the first preferred embodiment, black level luminance in the direction A attributable to the diffracted light d and e can be reduced as described above. On the other hand, in the direction B, although luminance of diffraction leakage light attributable to the diffracted light e increases, because the leakage luminance of straight proceeding light in the direction B is low, luminance of diffraction leakage light does not become higher than black level luminance in the direction A. Therefore, according to the liquid crystal display device of the first preferred embodiment, it is possible to improve the balance of black level luminance in the upper left direction (the direction A) and the upper right direction (the direction B) (equalization of black level luminance), and realize a satisfactory display quality of black level luminance which is low in both the direction A and the direction B.

In the above description, the first side is the right side and the second side is the left side. However, the sides are not limited to the above, and the first side may be the left side and the second side may be the right side. That is, there may be configured such that one side of the left side and the right side of the liquid crystal molecules 111 which is closer to the backlight 2 is the left side viewed from the observer side, and one side of the right side and the left side of the second edge part 110c which is positioned above is the left side viewed from the observer side. In this case too, like the above description, the balance of black level luminance in the upper left direction (the direction A) and the upper right direction (the direction B) can be increased. As a result, generation of high black level luminance that aggravates the display quality can be suppressed.

Further, in the first preferred embodiment, because the second edge parts 110c adjacent to the BM opening 110a is obliquely inclined, as illustrated in FIG. 21, at least one of the gate wire 132 and the common wire 133 is arranged partially along the second edge parts 110c by avoiding the BM opening 110a. Accordingly, the area of the BM opening 110a can be made large. Further, by increasing the wiring width of the gate wire 132 and the common wire 133, stabilization of driving in all pixels can be expected.

Further, according to the first preferred embodiment, the pixel electrode 114 and the common electrode 115 have a plurality of belt-shaped portions extending to the left-and-right direction, by inclination to the left-and-right direction at an angle of 5 degrees or above and 10 degrees or below. Either belt-shaped portions of the pixel electrode 114 or belt-shaped portions of the common electrode 115 are positioned between belt-shaped portions of the rest electrode. According to such a configuration, because the diffracted light in the up-and-down direction by the pixel electrodes can be suppressed, black level luminance can be reduced.

It has been described that the liquid crystal panel 3 according to the first preferred embodiment is the liquid crystal panel in the FFS mode. However, the liquid crystal panel is not limited to the above. The liquid crystal panel 3 can also obtain an effect similar to that described above in the case of a liquid crystal panel in the IPS mode which has electrodes such as a pixel electrode having a plurality of belt-shaped portions in the BM opening and which is orientated with liquid crystal molecules like the above description.

<Second Preferred Embodiment>

A liquid crystal display device in the FFS mode according to a second preferred embodiment of the present invention will be described with reference to FIGS. 24A to 24B. The liquid crystal cell in the second preferred embodiment is different from that in the first preferred embodiment in that a negative liquid crystal having negative dielectric anisotropy ($\Delta\in<0$) is used for a liquid crystal, and the like. However, the configuration of a polarization plate is the same as the configuration of the polarization plate in the first preferred embodiment (FIG. 18).

FIGS. 24A and 24B are views schematically illustrating a configuration of the liquid crystal cell 21 in the FFS mode according to the second preferred embodiment. FIG. 24A is a sectional view of the liquid crystal cell 21 viewed from a side surface, and FIG. 24B is a front view of the liquid crystal cell 21 viewed from the observer side.

The liquid crystal cell 21 includes a black matrix 210, a liquid crystal layer in which liquid crystal molecules 211 are orientated, a first glass substrate 212 which is a first transparent substrate, a second glass substrate 213 which is a second transparent substrate, a pixel electrode 214, a common electrode 215, and an insulation film 216. The first glass substrate 212 is arranged on the observer side, the second glass substrate 213 is arranged between the first glass substrate 212 and the backlight 2, so that the second glass substrate 213 is arranged nearer the backlight 2 than the first glass substrate 212.

On the first glass substrate 212 on the observer side, the black matrix 210 is selectively formed by coating or depositing a thin film that absorbs light. The black matrix 210 is patterned, and has the openings 210a through which the light from the backlight 2 can pass. The light from the backlight 2 is diffracted after passing through the opening 210a (hereinafter, also referred to as a "BM opening 210a") of the black matrix 210, and turned into diffracted light g and h.

As illustrated in FIG. 24B, the shape of the BM opening 210a of the second preferred embodiment is the same as that of the BM opening 110a of the first preferred embodiment in that the BM opening 210a is long in the up-and-down direction. However, the shape of the BM opening 210a is different from that of the BM opening 110a in that the upper side and the lower side of the BM opening 210a are not inclined.

On the second glass substrate 213 on the backlight 2 side, there are formed the pixel electrode 214 and the common electrode 215 via the insulation film 216 such as a silicon oxide film, and the pixel electrode 214 and the common electrode 215 are insulated by the insulation film 216. In this case, the pixel electrode 214 is formed by patterning a transparent conductive film made of ITO or the like into a belt shape, and has a plurality of belt-shaped portions extending to approximately the up-and-down direction, by inclination to the up-and-down direction at an angle of 5 degrees or above and 10 degrees or below. The common electrode 215 is formed of a solid film of a transparent conductive film made of ITO or the like (a film which is substantially not formed with an opening and the like). However, the structure is not limited to the above. The common electrode 215 may be positioned nearer the liquid crystal molecules 211 than the pixel electrode 214, and formed to have a plurality of belt-shaped portions extending to approximately the up-and-down direction, by inclination to the up-and-down direction at an angle of 5 degrees or above and 10 degrees or below. The pixel electrode 214 may be formed of a solid film of a transparent conductive film made of ITO or the like. Alternatively, both the pixel electrode 214 and the common electrode 215 may be formed to have the above plurality of belt-shaped portions.

As a laminated film of the first glass substrate 212 on the side nearest to the second glass substrate 213 and as a laminated film of the second glass substrate 213 on the side nearest the first glass substrate 212, there are formed orientation films (not illustrated) that are rubbed to the up-and-down direction indicated by an arrow f. By the orientation film, the liquid crystal molecules 211 sandwiched between the first and second glass substrates 212 and 213 are orientated to the up-and-down direction. Because the liquid crystal molecules 211 are negative liquid crystals having negative dielectric anisotropy ($\Delta\varepsilon<0$), the delay angle of the liquid crystal layer is aligned to the left-and-right direction.

In the second preferred embodiment, the liquid crystal cell 21 may be formed with a transmittance distribution region 221 and a refractive index distribution region 222 that cover the BM opening 210a, in addition to the above configuration elements. In FIG. 24B, the transmittance distribution region 221 is formed closer to the liquid crystal molecules 211 than the refractive index distribution region 222, but the formation is not limited to this. The refractive index distribution region 222 may be formed closer to the liquid crystal molecules 211 than the transmittance distribution region 221.

The transmittance distribution region 221 is arranged along the edge part of the black matrix 210 adjacent to the upper side and the lower side of the BM opening 210a (the edge part extending to the left-and-right direction in this case). The transmittance of the transmittance distribution region 221 is uniform in the left-and-right direction, and has a distribution to the up-and-down direction. In the transmittance distribution region 221, there is applied a thin film and the like of low transmittance that has a uniform thickness in the left-and-right direction and also has a larger thickness toward the outside of the BM opening 210a in the up-and-down direction, for example.

In the refractive index distribution region 222, there is applied an ITO film or a silicon nitride film (SiN film) having higher refractive index than that of the liquid crystal layer and the surrounding insulation film 216, and having a uniform thickness in the left-and-right direction and a large thickness near the center in the up-and-down direction, for example.

<Operation in Second Preferred Embodiment>

The diffraction leakage light includes diffraction attributable to the BM opening 210a and diffraction attributable to the pixel electrode 214. The pixel electrode 214 has a belt-shaped portion extending to approximately the up-and-down direction. Therefore, distributions of refractive index and transmittance are generated in the BM opening 210a. By the distributions, the diffracted light propagating to the left-and-right direction is strong, but diffracted light h propagating to the up-and-down direction is not substantially generated. Further, the diffracted light h propagating to the up-and-down direction due to the BM opening 210a is suppressed by the transmittance distribution region 221 and the refractive index distribution region 222.

Figure 25:
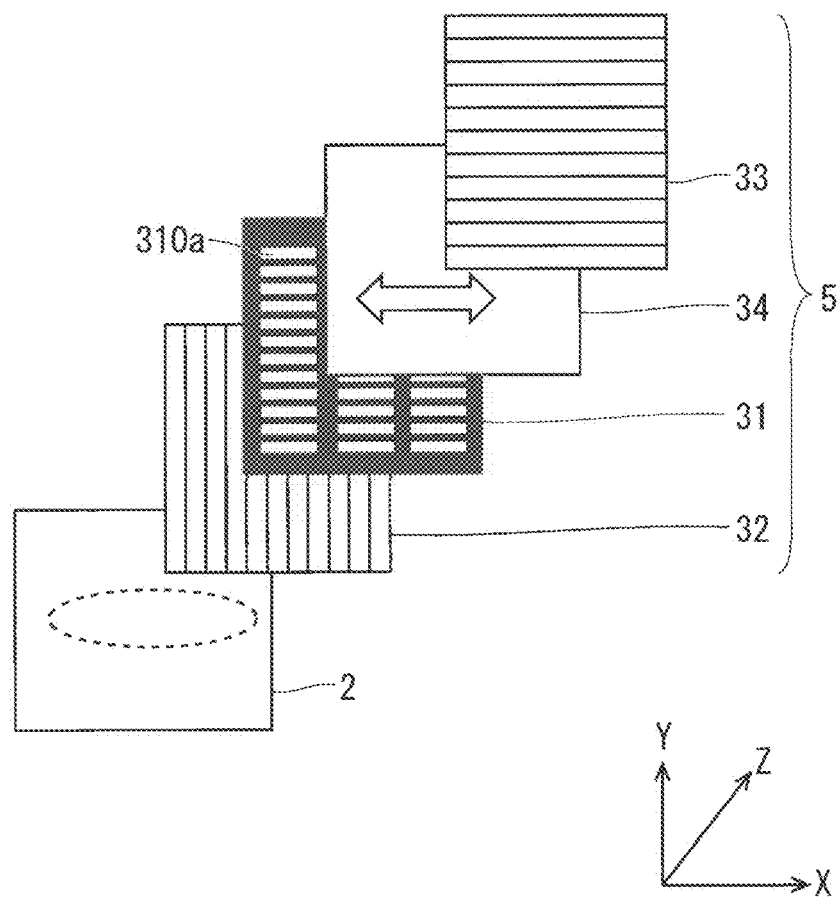
FIG. 25 is an exploded view illustrating a configuration of a liquid crystal display device according to a third preferred embodiment.

The diffracted light g in the left-and-right direction is a combination of diffracted light from the pixel electrode 214 and diffracted light from the BM opening 210a, and therefore increases as compared with diffracted light in the relevant device. However, as illustrated in FIG. 17 and FIG. 25, because the analyzer transmittance of diffracted light in the left-and-right direction toward the direction A is sufficiently low, the increase in black level luminance does not become a problem.

As described above, according to the liquid crystal display device of the second preferred embodiment, because diffraction leakage light can be suppressed, black level luminance in the direction A and the direction B, for example, can be suppressed.

In the above, it has been described that the liquid crystal panel according to the second preferred embodiment is the liquid crystal panel in the FFS mode, like in the first preferred embodiment. However, the liquid crystal panel is not limited to the above. A liquid crystal panel in the IPS mode which has electrodes such as a pixel electrode having a plurality of belt-shaped portions in the BM opening and which is orientated with liquid crystal molecules like the above description can also obtain an effect similar to that described above.

<Third Preferred Embodiment>

A liquid crystal display device in the FFS mode according to a third preferred embodiment of the present invention will be described with reference to FIG. 25 and FIGS. 26A and 26B. FIG. 25 is an exploded view illustrating a configuration of a liquid crystal display device in the FFS mode according to the third preferred embodiment. Also in the following description, the same symbols will be attached to configurations similar to those of the liquid crystal display device of the first preferred embodiment.

The liquid crystal display device according to the third preferred embodiment includes a liquid crystal panel 5, and the backlight 2. Like the above description, the backlight 2 has a light distribution characteristic that light distribution is wide in the left-and-right direction and narrow in the up-and-down direction as illustrated in FIG. 2, by using a laterally long lens-sheet and a diffusion sheet that are not illustrated.

The liquid crystal panel 5 includes a crystal cell 31 in the FFS mode, a polarizer 32, an analyzer 33, and a biaxial retardation film 34. The liquid crystal cell 31 includes a black matrix having openings 310a through which light from the backlight 2 can pass. Each opening 310a has a laterally-long rectangular shape which is long in the left-and-right direction, and a plurality of the openings 310a are laid out in the up-and-down and left-and-right directions as sub-pixels. Further, color filters in a blue color, a red color, and a green color not illustrated are provided in these openings 310a.

The polarizer 32 as a polarization plate is arranged on the light source side with respect to the liquid crystal cell 31. The absorption axis of the polarizer 32 is aligned to the up-and-down direction.

The analyzer 33 as a polarization plate is arranged on the observer side with respect to the liquid crystal cell 31 (the opposite side of the light source). The absorption axis of the analyzer 33 is aligned to the left-and-right direction orthogonal to the absorption axis of the polarizer 32. That is, the polarizer 32 and the analyzer 33 form crossed nicols.

While the biaxial retardation film 14 according to the first preferred embodiment is arranged between the polarizer 12 and the liquid crystal cell 11, the biaxial retardation film 34 according to the third preferred embodiment is arranged not between the polarizer 32 and the liquid crystal cell 31, but between the analyzer 33 and the liquid crystal cell 31. In the case where the left-and-right direction of the liquid crystal cell 31 is X, the up-and-down direction is Y, and the front-and-back direction as a direction of the observer is Z, then refractive indexes nx, ny, and, nz in the X, Y, and Z directions have a relation of nx>ny, nz, and ny≠nz. For example, in the case where $(nx-nz)/(nx-ny)=\frac{1}{2}$ and the thickness of the biaxial retardation film 14 is d, a relationship of $(nx-ny) \times d = 275$ nm is established. Although the relationship of nx>ny is set above, the relationship may be ny>nx, like the description in the first preferred embodiment.

Figure 26:
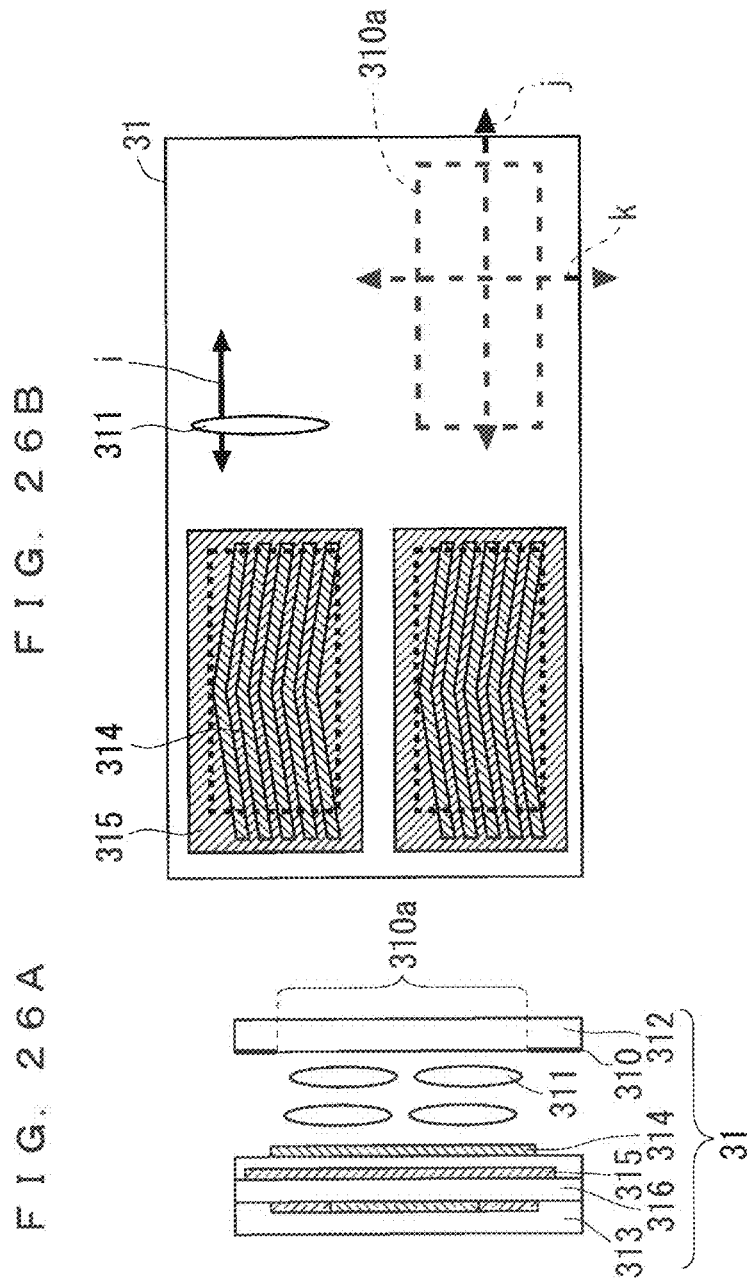
FIGS. 26A and 26B are views illustrating a configuration of a liquid crystal cell according to the third preferred embodiment.

FIGS. 26A and 26B are views schematically illustrating a configuration of the liquid crystal cell 31 in the FFS mode according to the third preferred embodiment. FIG. 26A is a sectional view of the liquid crystal cell 31 viewed from a side surface, and FIG. 26B is a front view of the liquid crystal cell 31 viewed from the observer side.

The liquid crystal cell 31 includes a black matrix 310, a liquid crystal layer in which liquid crystal molecules 311 are orientated, a first glass substrate 312 as a first transparent substrate, a second glass substrate 313 as a second transparent substrate, a pixel electrode 314, a common electrode 315, and an insulation film 316. The first glass substrate 312 is arranged on the observer side, the second glass substrate 313 is arranged between the first glass substrate 312 and the backlight 2, so that the second glass substrate 313 is arranged nearer the backlight 2 than the first glass substrate 312.

On the first glass substrate 312 on the observer side, the black matrix 310 is selectively formed by coating or depositing a thin film that absorbs light. The black matrix 310 is patterned, and has the openings 310a through which the light from the backlight 2 can pass. The light from the backlight 2 is diffracted after passing through the opening 310a (hereinafter, also referred to as a "BM opening 310a") of the black matrix 310, and turned into diffracted light j and k.

As illustrated in FIG. 26B, the shape of the BM opening 310a according to the third preferred embodiment is different from that of the BM opening 210a according to the second preferred embodiment in that the BM opening 310a is long in the left-and-right direction.

On the second glass substrate 313 on the backlight 2 side, there are formed the pixel electrode 314 and the common electrode 315 via the insulation film 316 such as a silicon oxide film, and the pixel electrodes 314 and the common electrode 315 are insulated by the insulation film 316. In this case, the pixel electrode 314 is formed by patterning a transparent conductive film made of ITO or the like into a belt shape, and has a plurality of belt-shaped portions extending to approximately the left-and-right direction, by inclination to the left-and-right direction at an angle of 5 degrees or above and 10 degrees or below. The common electrode 315 is formed of a solid film of a transparent conductive film made of ITO or the like (a film which is substantially not formed with an opening and the like). However, the structure is not limited to the above. The common electrode 315 may be formed to have a plurality of belt-shaped portions extending to approximately the left-and-right direction, by inclination to the left-and-right direction at an angle of 5 degrees or above and 10 degrees or below. The pixel electrode 314 may be formed of a solid film of a transparent conductive film made of ITO or the like. Alternatively, both the pixel electrode 314 and the common electrode 315 may be formed to have the above plurality of belt-shaped portions.

As a laminated film of the first glass substrate 312 on the side nearest to the second glass substrate 313 and as a laminated film of the second glass substrate 313 on the side nearest to the first glass substrate 312, there are formed orientation films (not illustrated) that are rubbed to the left-and-right direction indicated by an arrow i. By the orientation film, a slow axis of the liquid crystal molecules 311 sandwiched between the first and second glass substrates 312 and 313 are aligned to the up-and-down direction. The liquid crystal molecules 311 are negative liquid crystals having negative dielectric anisotropy ($\Delta\epsilon<0$).

<Operation in Third Preferred Embodiment>

As described above, black level luminance is the sum of the leakage luminance of straight proceeding light and luminance of various kinds of scattering leakage light.

Figure 27:
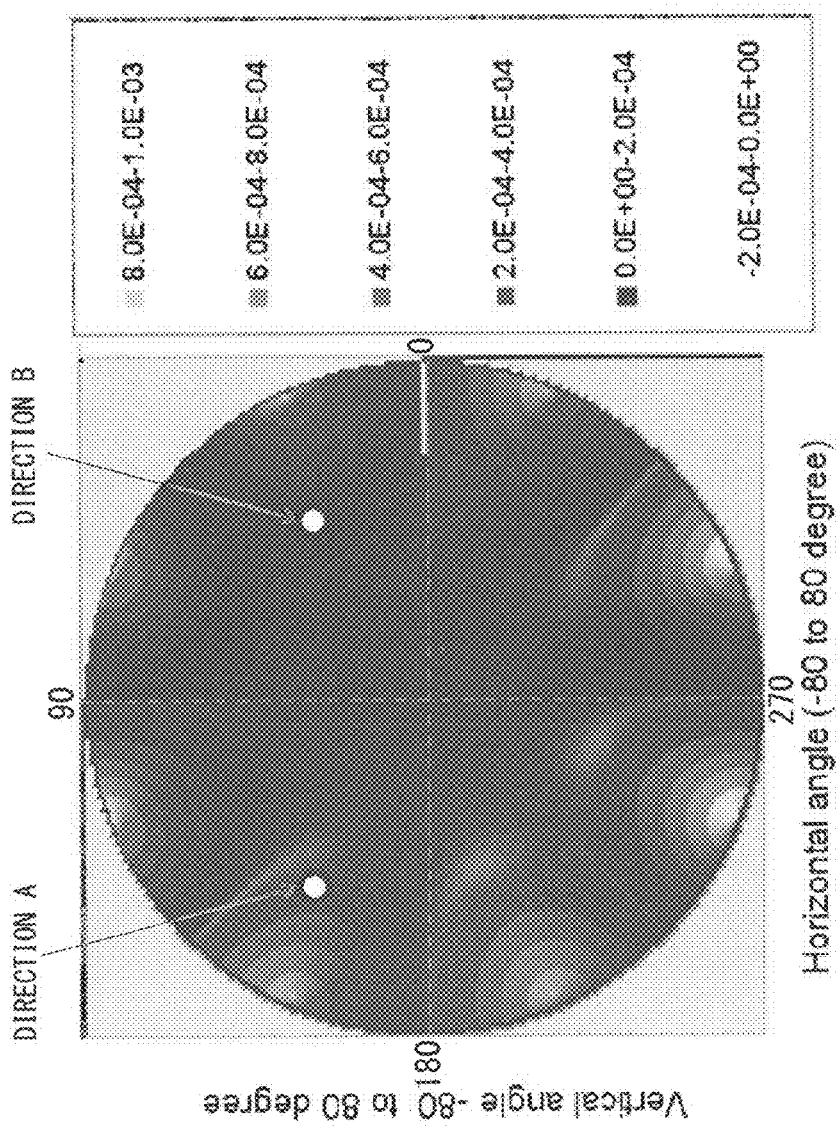
FIG. 27 is a contour view illustrating distribution of transmittance of straight proceeding light at a black level in the liquid crystal display device according to the third preferred embodiment.

First, the leakage luminance of straight proceeding light will be described. FIG. 27 illustrates an angle distribution of transmittance of straight proceeding light calculated by the Jones matrix method in the liquid crystal display device in the FFS mode according to the third preferred embodiment. It is assumed here that there is no axis deviation in the polarizer 32, the analyzer 33, and the biaxial retardation film 34. Because the liquid crystal molecules 311 are negative liquid crystals and there is no inclination of the slow axis due to the pretilt angle, a light-direction angle distribution of transmittance is symmetrical in the up-and-down and left-and-right directions.

Figure 28:
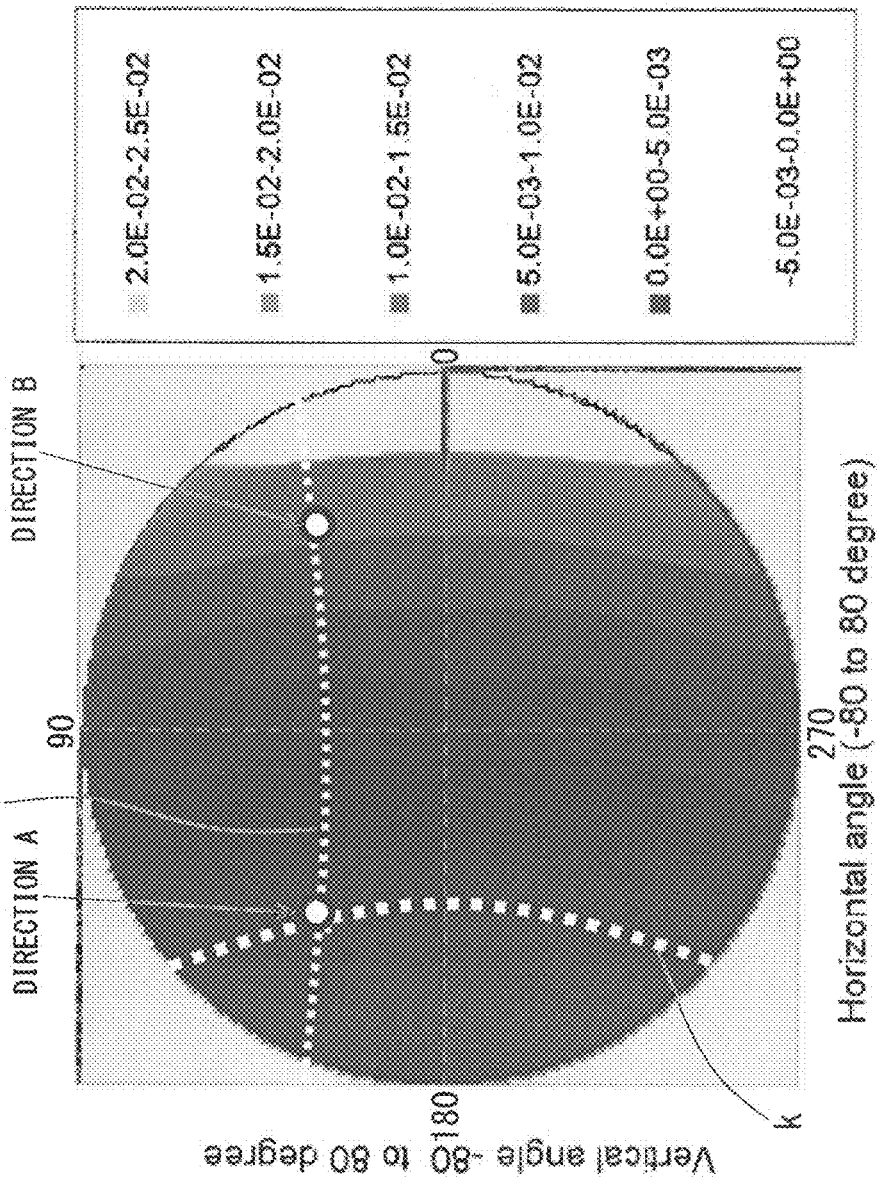
FIG. 28 is a contour view illustrating a relationship between a transmittance distribution of diffracted light toward the direction A and an incident angle of incident beam light in the liquid crystal display device according to the third preferred embodiment.

FIG. 28 is a contour view illustrating a relationship between the analyzer transmittance of diffracted light proceeding to the direction A (polar angle 45 degrees and azimuth angle 156 degrees) and the incident angle of incident beam light. The contour view is obtained by Jones matrix calculation, based on the generation model of diffraction leakage light described above.

According to the liquid crystal display device in the third preferred embodiment, it is clear that the analyzer transmittance of diffracted light generated by incident light in the up-and-down direction near the direction A is low. Because the BM opening 310a has a laterally-long shape and the pixel electrode 314 has a laterally long belt shape, diffracted light k which propagates to the up-and-down direction is relatively strong but leakage luminance can be suppressed to be low. Although transmittance of diffracted light which generates by incident light in the right direction is relatively high, because the BM opening 310a has a laterally-long shape and the pixel electrode 314 has a laterally long belt shape, generation of diffracted light j which propagates to the left-and-right direction is small and luminance of diffraction leakage light can be suppressed. From the above black level luminance in the direction A can be suppressed to become low. Because the structure is symmetrical in the up-and-down and left-and-right directions, black level luminance in the direction B and in the left-and-right lower direction can be also suppressed.

In the above, it has been described that the liquid crystal panel according to the third preferred embodiment is the liquid crystal panel in the FFS mode, like in the first preferred embodiment. However, the liquid crystal panel is not limited to the above. A liquid crystal panel in the IPS mode which has electrodes such as a pixel electrode having a plurality of belt-shaped portions in the BM opening and which is orientated with liquid crystal molecules like the above description can also obtain an effect similar to that described above.

The liquid crystal cell 31 according to the third preferred embodiment may include a transmittance distribution region and a refractive index distribution region, like in the second preferred embodiment. However, it is desirable that the distributions are uniform in the up-and-down direction and have a change in the left-and-right direction. Accordingly, generation of the diffracted light j in higher transmittance can be suppressed. Needless to say, the liquid crystal cell 11 in the first preferred embodiment may include a transmittance distribution region and a refractive index distribution region, like in the second preferred embodiment.

Further, although the case of using rubbing of the orientation film has been described as a method of orientating liquid crystals, a similar effect can be also obtained by using a light distribution.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
    a light source of which a light distribution characteristic in a left-and-right direction is wider than a light distribution characteristic in an up-and-down direction; and
    a liquid crystal panel in an IPS (In-Plane Switching) mode or an FFS (Fringe Field Switching) mode in which light from said light source is capable of passing,
    said liquid crystal panel including:
        a liquid crystal cell which includes a first transparent substrate, a second transparent substrate arranged between said first transparent substrate and said light source, liquid crystal molecules sandwiched between the substrates, and a black matrix having an opening through which light from said light source is capable of passing;
        a polarizer which is arranged on said light source side with respect to said liquid crystal cell and in which an absorption axis is aligned in said up-and-down direction;
        an analyzer which is arranged on a side opposite to said light source with respect to said liquid crystal cell and in which an absorption axis is aligned in said left-and-right direction; and
        a biaxial retardation film which is arranged between said polarizer and said liquid crystal cell,
    wherein
    said liquid crystal molecules have a pretilt angle to said left-and-right direction in a plane perpendicular to said up-and-down direction, so that an end part of a first side as one side of a left side and a right side of said liquid crystal molecules viewed from said analyzer side is set closer to said light source than an end part of a second side as the other side,
    first edge parts of said black matrix adjacent to a left side and a right side of said opening have a straight line shape extending in said up-and-down direction, and
    second edge parts of said black matrix adjacent to the upper side and the lower side of said opening have a straight line shape extending by inclination to mutually the same side with respect to said left-and-right direction, so that an end part of said first side of said second edge parts viewed from said analyzer is positioned above an end part of said second side.

2. The liquid crystal display device according claim 1, wherein
    said pretilt angle is 0.5 degrees or above and 5 degrees or below, and
    an inclination angle of said second edge parts is 10 degrees or above and 60 degrees or below.

3. The liquid crystal display device according claim 1, wherein
    said liquid crystal cell further includes at least one of a gate wire and a common wire arranged partially along said second edge parts by avoiding said opening.

4. The liquid crystal display device according claim 1, wherein
    said liquid crystal cell further includes a pixel electrode and a common electrode each having a plurality of belt-shaped portions extending to said left-and-right direction by inclination at an angle of 5 degrees or above and 10 degrees or below, and
    either belt-shaped portions of said pixel electrode or belt-shaped portions of said common electrode are positioned between belt-shaped portions of a rest electrode.

5. A liquid crystal display device comprising:
    a light source; and
    a liquid crystal panel in an IPS (In-Plane Switching) mode or an FFS (Fringe Field Switching) mode in which light from said light source is capable of passing,
    said liquid crystal panel including:
        a liquid crystal cell which includes a first transparent substrate, a second transparent substrate arranged between said first transparent substrate and said light source, liquid crystal molecules sandwiched between the substrates, and a black matrix having an opening through which light from said light source is capable of passing;
        a polarizer which is arranged on said light source side with respect to said liquid crystal cell and in which an absorption axis is aligned in an up-and-down direction;
        an analyzer which is arranged on a side opposite to said light source with respect to said liquid crystal cell and in which an absorption axis is aligned in a left-and-right direction; and
        a biaxial retardation film which is arranged between said polarizer and said liquid crystal cell,
    wherein
    said opening of said black matrix has a longitudinal rectangular shape which is long in said up-and-down direction,
    said liquid crystal cell further includes at least one of a pixel electrode and a common electrode each having a plurality of belt-shaped portions extending to said up-and-down direction by inclination at an angle of 5 degrees or above and 10 degrees or below,
    said liquid crystal molecules are negative liquid crystals, and
    said liquid crystal cell further includes:
        a transmittance distribution region and a refractive index distribution region that cover said opening, said transmittance distribution region and said refractive index distribution region having respective distributions that are uniform in said left-and-right direction and different in said up-and-down direction.

6. The liquid crystal display device according to claim 5, wherein
    the angle of inclination of the belt-shaped portions is inclined from a direction parallel to the starting alignment of the liquid crystal layer.

7. A liquid crystal display device comprising:
    a light source of which a light distribution characteristic in a left-and-right direction is wider than a light distribution characteristic in an up-and-down direction; and
    a liquid crystal panel in an IPS (In-Plane Switching) mode or an FFS (Fringe Field Switching) mode in which light from said light source is capable of passing, the liquid crystal panel including:
a liquid crystal cell which includes a first transparent substrate, a second transparent substrate arranged between said first transparent substrate and said light source, and liquid crystal molecules sandwiched between the substrates;
a polarizer which is arranged on said light source side with respect to said liquid crystal cell and in which an absorption axis is aligned in an up-and-down direction;
an analyzer which is arranged on a side opposite to said light source with respect to said liquid crystal cell and in which an absorption axis is aligned in a left-and-right direction; and
a biaxial retardation film which is arranged between said polarizer and said liquid crystal cell,
wherein
said liquid crystal cell further includes at least one of a pixel electrode and a common electrode each having a plurality of belt-shaped portions extending to said left-and-right direction by inclination at an angle of 5 degrees or above and 10 degrees or below,
said liquid crystal molecules are negative liquid crystals, and
said liquid crystal cell further includes:
a black matrix having an opening through which light from said light source is capable of passing; and
a transmittance distribution region and a refractive index distribution region that cover said opening, said transmittance distribution region and said refractive index distribution region having respective distributions that are uniform in said up-and-down direction and different in said left-and-right direction.

8. The liquid crystal display device according to claim 7, wherein
said liquid crystal cell further includes
a black matrix having an opening through which light from said light source is capable of passing, and
said opening of said black matrix has a longitudinal rectangular shape which is long in said left-and-right direction.

9. The liquid crystal display device according to claim 7, wherein
the angle of inclination of the belt-shaped portions is inclined from a direction perpendicular to the starting alignment of the liquid crystal layer.

* * * * *